US009762676B2

(12) United States Patent
Olcese et al.

(10) Patent No.: US 9,762,676 B2
(45) Date of Patent: Sep. 12, 2017

(54) HARDWARE RESOURCE ACCESS SYSTEMS AND TECHNIQUES

(71) Applicant: Intel Corporation, Santa Clara, CA (US)

(72) Inventors: Jose A. Olcese, Portland, OR (US); Ricardo A. Morin, Portland, OR (US); Vadim Gore, Beaverton, OR (US); Suman Sharma, San Jose, CA (US); Narasimham Gadiraju, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 14/497,581

(22) Filed: Sep. 26, 2014

(65) Prior Publication Data

US 2016/0094664 A1    Mar. 31, 2016

(51) Int. Cl.
*H04L 29/08* (2006.01)
*G06F 9/44* (2006.01)

(52) U.S. Cl.
CPC .............. *H04L 67/142* (2013.01); *G06F 8/31* (2013.01)

(58) Field of Classification Search
CPC ......... H04L 67/142; G06F 9/44; G06F 9/468; G06F 9/5027; G06F 9/5055; G06F 9/5061; G06F 9/5083; G06F 9/54; G06F 9/542

(Continued)

(56) References Cited

U.S. PATENT DOCUMENTS

| 6,587,867 B1 * | 7/2003 | Miller ................... G06Q 20/10 705/38 |
| 2005/0182966 A1 * | 8/2005 | Pham ..................... G06F 21/51 726/5 |

(Continued)

FOREIGN PATENT DOCUMENTS

| EP | WO2015099722 | * 12/2013 | ............. G06F 13/14 |
| JP | 2010039742 A | 2/2010 | |

(Continued)

OTHER PUBLICATIONS

International Search Report and Written Opinion dated Nov. 4, 2015 for International Application No. PCT/US2015/041797, 16 pages.

(Continued)

*Primary Examiner* — David Lazaro
*Assistant Examiner* — Berhanu Shitayewoldetsad
(74) *Attorney, Agent, or Firm* — Schwabe, Williamson & Wyatt, P.C.

(57) ABSTRACT

Systems and techniques for hardware resource access are disclosed herein. In some embodiments, an apparatus may receive, via a stateless protocol message, a request from an application to pair with a hardware resource of a computing device remote from the apparatus. The apparatus may provide to the computing device, via a stateless protocol message, identifiers of the application and the hardware resource, and may receive, via a stateless protocol message, pairing approval from the computing device. In response to receiving the pairing approval, the apparatus may generate a pairing token that may be used by the application to pair the application with the hardware resource. Other embodiments may be disclosed and/or claimed.

25 Claims, 10 Drawing Sheets

(58) Field of Classification Search
USPC .................................................. 709/225–245
See application file for complete search history.

(56) References Cited

U.S. PATENT DOCUMENTS

| | | | |
|---|---|---|---|
| 2006/0095538 A1* | 5/2006 | Rehman | H04L 67/14 709/217 |
| 2010/0054273 A1* | 3/2010 | Johnson | E21B 47/12 370/428 |
| 2011/0296515 A1 | 12/2011 | Krstic et al. | |
| 2012/0110646 A1* | 5/2012 | Ajitomi | G06F 21/335 726/4 |
| 2012/0144202 A1 | 6/2012 | Counterman | |
| 2013/0086211 A1 | 4/2013 | Sondhi et al. | |
| 2013/0103847 A1* | 4/2013 | Brown | H04L 63/083 709/229 |
| 2013/0326614 A1 | 12/2013 | Truskovsky et al. | |
| 2014/0026193 A1* | 1/2014 | Saxman | G06F 21/33 726/4 |
| 2014/0156726 A1 | 6/2014 | Bohlmann et al. | |
| 2014/0157430 A1* | 6/2014 | McDowell-White | H04L 63/083 726/27 |
| 2015/0288667 A1* | 10/2015 | Alder | H04L 63/061 713/171 |

FOREIGN PATENT DOCUMENTS

| | | |
|---|---|---|
| JP | 2011212231 A | 10/2011 |
| TW | M451895 U | 5/2013 |

OTHER PUBLICATIONS

Office Action dated Dec. 16, 2016 for Taiwanese Patent Application No. 104125224, 23 pages.
International Preliminary Report on Patentability dated Apr. 6, 2017 for International Application No. PCT/US2015/041797, 12 pages.
Office Action dated Apr. 26, 2017 from Taiwan Patent Application No. 104127513, 7 pages.

* cited by examiner

HARDWARE RESOURCE ACCESS SYSTEMS AND TECHNIQUES

FIELD

Embodiments of the present disclosure generally relate to the field of computing devices, and more particularly, to hardware resource access.

BACKGROUND

Many computing devices include hardware resources that support operation of the computing device, such as sensors and memory devices. Access to these hardware resources is conventionally controlled by proprietary protocols or is manually configured as part of an enterprise device group.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
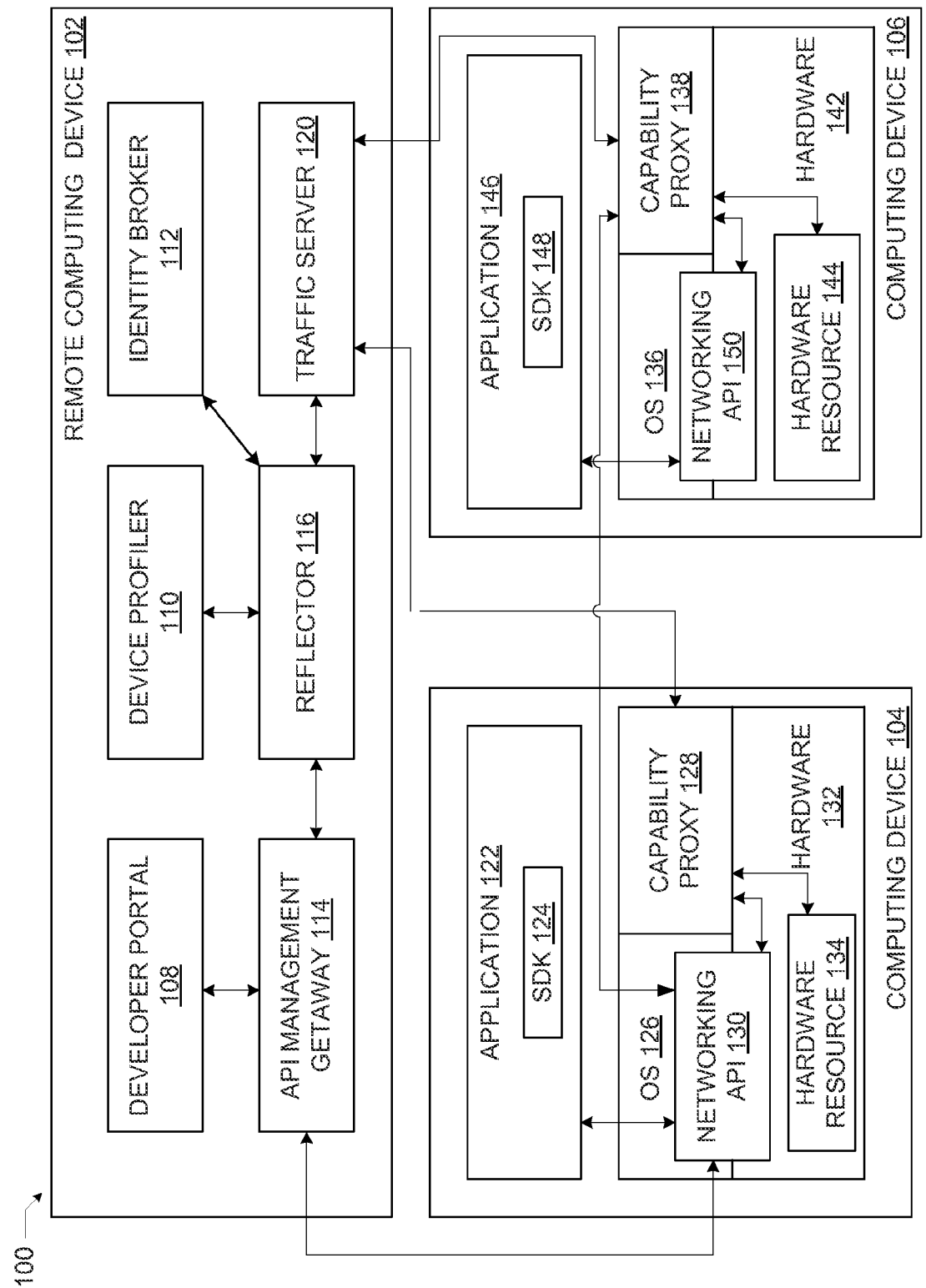
FIG. 1 is a block diagram of a resource access management system, in accordance with various embodiments.

Systems and techniques for hardware resource access are disclosed herein. In some embodiments, an apparatus may receive, via a stateless protocol message (e.g., a Representational State Transfer (REST) call), a request from an application to pair with a hardware resource of a computing device remote from the apparatus. The apparatus may provide to the computing device, via a stateless protocol message, identifiers of the application and the hardware resource, and may receive, via a stateless protocol message, pairing approval from the computing device. In response to receiving the pairing approval, the apparatus may generate a pairing token that may be used by the application to pair the application with the hardware resource. As used herein, "pairing" may refer to a process by which an application may be authorized to access a hardware resource, and may be separate from an act of access by the application to the hardware resource.

In some embodiments, an apparatus may receive, via a stateless protocol message, request data from a computing device. The request may identify a hardware resource of the apparatus and an application that has provided a pairing request for pairing with the hardware resource. In response to receipt of the request data, the apparatus may provide, to the computing device via a stateless protocol message, an approval or a denial of the pairing request. The apparatus may also receive, via a stateless protocol message, an access request from the application for access to the hardware resource. The access request may include a pairing token that was generated and provided to the application by the computing device in response to receipt by the computing device of an approval of the pairing request. The apparatus may validate or invalidate the token, and in response to validation of the token, may provide data from the hardware resource for provision to the application (e.g., via a stateless protocol message, such as a REST call).

The embodiments disclosed herein may find particularly advantageous application in cloud environments, such as those in which hardware is provided as a service. As suggested above, many of the embodiments disclosed herein may utilize the REST protocol during communications. In the REST protocol, resources (such as hardware resources) may be addressed using a uniform resource identifier, and standard commands such as GET, POST, PUT, and DELETE may be used to interact with these resources. This may provide a uniform interface by which many different kinds of applications may access many different kinds of resources. The REST protocol may be referred to as a "stateless" protocol, in the sense that all of the information needed to process a REST call may be included in the REST call. As used herein, the term "stateless protocol message" may refer to a message formatted in accordance with a stateless communication protocol such that all information needed for a receiving device to process the stateless protocol message is included in the stateless protocol message. It will be appreciated by one skilled in the art that REST is discussed herein for exemplary purposes only, and that other stateless protocols using HTTP, XML or other transport or markup languages may be used to implement the disclosed embodiments. When appropriate, a stateful protocol (such as SOAP) may also be suitably modified for use in the embodiments disclosed herein.

Use of a uniform interface for managing access to hardware resources may enable developers to provide such access in a manner not previously achievable. For example, many conventional devices utilize software environments or stacks (e.g., proprietary operating systems) in which it is not possible for applications (local and/or remote) to access certain hardware resources. In some embodiments, this restriction in access is imposed by developers of the software stack, who may simply not have developed any suitable pathways through which such access may take place. For example, some two-in-one systems may have a sensor that can determine whether the system is in tablet mode or desktop mode. However, data generated by the sensor is not available to applications in standard operating environments, so applications cannot change the user experience based on the current mode. In another example, a user may have a laptop that does not include a global positioning system (GPS) receiver, but the user may have a smartphone with such a receiver. Conventionally, the user is unable to access the GPS receiver in her smartphone from her laptop.

Various ones of the embodiments disclosed herein may use standard networking channels that are almost always present in a computing environment to access such resources. In particular embodiments, hardware resources may be exposed as RESTful services or services of another stateless communication protocol. If a local path to the hardware resource is available, the REST call or other stateless protocol message may be made locally. If not, a remote component (e.g., the remote computing device 102 discussed below with reference to FIG. 1) may route the request to the correct location (either locally or on another computing device) and may also be configured to set up a device-to-device channel in the case of multi-device communication.

Various embodiments disclosed herein may enable applications to access useful hardware functionality, and may make it easier for developers to allow for and take advantage of such access. Moreover, various embodiments disclosed herein provide a common protocol with which many different types of applications can access many different types of hardware resources, unlike the highly proprietary systems existing.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality. Any of the logic and computing devices disclosed herein may include or have access to storage devices to store any suitable data or instructions used to provide the described functionality.

FIG. 1 is a block diagram of a resource access management system 100, in accordance with various embodiments. The resource access management system 100 may include a computing device 104, a computing device 106, and a remote computing device 102. The remote computing device 102 may be remote from both the computing device 104 and the computing device 106. Although FIG. 1 illustrates only two computing devices 104 and 106 in communication with each other and with the remote computing device 102, the resource access management system 100 may include any number of computing devices, configured similarly to computing devices 104 and 106 as described herein, in communication with each other in any combination and with the remote computing device 102.

The operation of the resource access management system 100 may be described below with reference to example use cases in which an application of the computing device 104 accesses a hardware resource of the computing device 106, and cases in which an application of the computing device 104 accesses a hardware resource of the computing device 104. As used herein, an application may be said to "access" a hardware resource when the application controls an operation of the hardware resource or when the application receives data generated by the hardware resource. However, this is for ease of illustration only, and the computing device 106 may access hardware resources of other computing devices (e.g., the computing device 104) in accordance with any of the techniques disclosed herein (e.g., those discussed as performed by the computing device 104). Additionally, the following discussion may focus on various components of the computing device 104, but the analogous components of the computing device 106 may be configured analogously.

The computing device 104 may include hardware 132. The hardware 132 may include any computing device hardware, such as any of the hardware discussed below with reference to FIG. 11. The hardware 132 may include a hardware resource 134 to which applications executing on the computing device 104 (or on other computing devices, such as the computing device 106) may request access. Examples of such a hardware resource 134 may include sensors, a transcoding device for converting media files from one format to another, imaging devices (such as 3-D cameras), audio recording devices, positioning devices (such as Global Positioning System (GPS) receivers), display devices, robotic devices, one-time password capability (e.g., in accordance with Identity Protection Technology of Intel Corporation, Santa Clara, Calif.), perceptual computing capabilities (e.g., in accordance with REALSENSE™ of Intel Corporation, Santa Clara, Calif.), but these are simply examples, and access to any suitable hardware resource may be managed in accordance with the embodiments disclosed herein. Additionally, although the hardware resource 134 may be referred to in the singular, this is simply for ease of discussion, and the computing device 104 may include two or more hardware resources to which access may be granted. The hardware 142 may be in accordance with any of the embodiments of the hardware 132.

The hardware 132 of the computing device 104 may support the operation of an operating system (OS) 126, an application 122, and a networking Application Programming Interface (API) 130. The OS 126 may be any suitable OS, such as a UNIX-based OS, a mobile device OS, a laptop or tablet OS, a desktop computer OS, or a server OS. The application 122 may execute on the computing device 104 (e.g., using processors included in the hardware 132). In some embodiments, the application 122 may execute within the OS 126, while in other embodiments, the application 122 may execute outside of the OS 126. The networking API 130 may serve as an interface between the OS 126 and the hardware 132, and/or as an interface between the application 122 and the hardware 132. The networking API 130 may also facilitate communication between the computing device 104 and the computing device 106 via the remote computing device 102 (e.g., via the traffic server 120, as discussed below). The networking API 150 may be in accordance with any of the embodiments of the networking API 130, and the OS 136 may be in accordance with any of the embodiments of the OS 126.

In some embodiments, the application 122 may include or have access to a Software Development Kit (SDK) 124. The SDK 124 may be a package of predetermined instructions that make it easier for developers to program the application 122 to use the capabilities of the resource access management system 100. In some embodiments, the SDK 124 may support multiple programming languages. The SDK 124 may be specific to one or more particular hardware resources (e.g., GPS devices or cameras) and may aid the developer in configuring application 122 to access these kinds of hardware resources using the techniques disclosed herein. For example, if a developer wishes to configure the application 122 to access a GPS receiver, the SDK 124 may provide particular syntax regarding particular GPS receiver capabilities (e.g., latitude, longitude, and accuracy formats) that the developer may use to more readily access and utilize data from GPS receiver. In some embodiments, the SDK 124 may include predetermined instructions that a developer may use to enable the application 122 to detect the "best" pathway between the application 122 and a desired hardware resource (e.g., to determine whether a local or remote pathway is most efficient). The SDK 148 may be in accordance with any of the embodiments of the SDK 124.

The hardware 132 may also support the operation of a capability proxy 128. In some embodiments, the capability proxy 128 may be partitioned or otherwise isolated from the OS 126 in the computing device 104. For example, the capability proxy 128 may be embedded in the hardware 132 and isolated from the OS 126. The capability proxy 128 may be coupled with the networking API 130 and the hardware resource 134, and may assist in regulating access to the hardware resource 134 and/or to the hardware resources of other computing devices (e.g., the hardware resource 144 of the computing device 106) in accordance with the embodiments disclosed herein. For example, the capability proxy 128 may be configured to receive (e.g., via a stateless protocol message, such as a REST call) request data that identifies a particular hardware resource 134 and an application (e.g., the application 122 or the application 146) that has requested to pair with the particular hardware resource 134. In response to receipt of the request data, the capability proxy 128 may be configured to provide (e.g., via a stateless protocol message, such as a REST call), an approval of the pairing request or a denial of the pairing request. In another example, the capability proxy 128 may be configured to receive (e.g., via a stateless protocol message, such as a REST call), a request for access to a particular hardware resource 134 from an application (e.g., the application 122 or the application 146), and to evaluate a pairing token provided with the access request. If the capability proxy 128 validates the pairing token, the capability proxy 128 may be configured to provide (e.g., via a stateless protocol message, such as a REST call) data from the hardware resource 134 for provision to the application (thereby granting access to the hardware resource).

As discussed in further detail below, the capability proxy 128 may be configured to validate a pairing token in any of a number of ways. For example, in embodiments in which the application requesting access to the hardware resource 134 purports to be local to the computing device 104, the capability proxy 128 may be configured to validate the pairing token if an IP address of the application matches an IP address of the computing device 104 (and invalidate the pairing token otherwise). In some embodiments, the reflector 116 may provide this IP address information to the capability proxy 128. In some embodiments, the capability proxy 128 may be configured to validate the pairing token if the pairing token includes a correct identifier for the computing device 104 (and invalidate the pairing token otherwise). Various embodiments of the capability proxy 128 are discussed below with reference to FIG. 3.

When the application 122 of the computing device 104 wishes to access the hardware resource 134 of the computing device 104, management of that access may be performed via the capability proxy 128. The application 122 may communicate with the capability proxy 128 in any of a number of ways. In some embodiments, the application 122 may communicate with the networking API 130, which may in turn communicate with the capability proxy 128 via a device-to-device pathway. One example of a device-to-device pathway that may be used is a Web Real-Time Communication (WebRTC) pathway. In some embodiments, the application 122 may communicate with the networking API 130, which may in turn communicate with the reflector 116 of the remote computing device 102 (e.g., via the API management gateway 114, as shown). Various embodiments of the reflector 116 are discussed below with reference to FIG. 2. Communication between the networking API 130 and the API management gateway 114 may take place via a cloud pathway or cloud device-to-device pathway, such as a REST pathway. The reflector 116 may in turn communicate with the capability proxy 138 (e.g., via the traffic server 120). Communication between the traffic server 120 and the capability proxy 138 may take place via a cloud pathway or cloud device-to-device pathway, such as an Extensible Messaging and Presence Protocol (XMPP) pathway.

When the application 122 of the computing device 104 wishes to access the hardware resource 144 of the computing device 106, local management of that access may be performed via the capability proxy 138. In some embodiments, the application 122 may communicate with the capability proxy 138 via the networking API 130, which may in turn communicate with the capability proxy 138 via a local pathway. Once the capability proxy 138 has received access-related data from the application 122, the capability proxy 138 may communicate with the reflector 116 to manage access to a particular hardware resource 144. In some embodiments, the capability proxy 138 may communicate with the reflector 116 via the networking API 130 and the API management gateway 114. This communication may take place via a cloud pathway or cloud device-to-device pathway, such as a REST pathway. In some embodiments, the capability proxy 128 may communicate with the reflector 116 via the traffic server 120. This communication may take place via a cloud pathway, such as an XMPP pathway.

In some embodiments, the capability proxy 128 may have access to the hardware resource 134 and may expose the hardware resource 134 as a RESTful service or a service of another stateless communication protocol. The capability proxy 128 may be instantiated as logic in a conventional computing device (e.g., stored instructions in a memory accessible by a processor or implemented in embedded specialized hardware). As discussed in further detail below, the capability proxy 128 may maintain a connection with the remote computing device 102 (e.g., the reflector 116) and may use this connection to serve requests from applications that cannot reach the capability proxy 128 directly (e.g., due to firewall issues, Network Address Translation (NAT) issues, proxy issues, etc.).

The capability proxy 128 may be implemented at any suitable level within the computing device 104. For example, in some embodiments, the capability proxy 128 may be included in a kernel application of the computing device 104 (and may thereby have special privileges for accessing hardware resources). In some embodiments, the capability proxy 128 may be included in a network interface card having a programmed processor that monitors all packets received and transmitted by the computing device 104. In such an embodiment, the capability proxy 128 may be configured to route packets in accordance with the techniques disclosed herein. In some embodiments, the capability proxy 128 may be included in a manageability engine of the computing device 104. A manageability engine may include a processor running on the computing device 104 that has more privileges for hardware access than the main processor(s) and that may manage the keyboard, various hardware drivers, power supplies, and other essential hardware functionality.

As indicated above, the remote computing device 102 may include a reflector 116. The reflector 116 may be implemented as one or more computing devices, and may be configured to assist in the management of pairing and access to hardware resources in the resource access management system 100. For example, the reflector 116 may be configured to receive (e.g., via a stateless protocol message, such as a REST call) a request from an application (e.g., the application 122 or the application 146) to pair with a hardware resource of a computing device remote from the reflector 116 (e.g., a hardware resource of the hardware resources 134 and 144 of the computing devices 104 and 106, respectively). The reflector 116 may provide, to the computing device (e.g., via a stateless protocol message, such as a REST call), identifiers of the application and the hardware resource, and may receive (e.g., via a stateless protocol message, such as a REST call) pairing approval from the computing device. In response to receiving the pairing approval, the reflector 116 may generate a pairing token that may be used by the application to pair with the hardware resource.

The reflector 116 may be configured to generate multiple different types of tokens for use in various applications. For example, the reflector 116 may be configured to generate a temporary token for provision to an application (e.g., the application 122 or the application 146), in response to receipt of a pairing request from that application. The temporary token may be provided (e.g., via a stateless protocol message, such as a REST call) by the application to the computing device associated with the hardware resource with which pairing is desired. In response to receiving the temporary token, the computing device may send a request to the reflector 116 (e.g., via a stateless protocol message, such as a REST call), including the temporary token, for the request data discussed above. In some embodiments, the reflector 116 may be configured to require that the application provide the reflector 116 with the temporary token (e.g., via a stateless protocol message, such as a REST call), and that pairing approval be received, before providing the pairing token to the application. The reflector 116 may also be configured to provide other suitable information to various components of the resource access management system 100. For example, in some embodiments, the reflector 116 may be configured to provide, to a computing device (e.g., via a stateless protocol message, such as a REST call), the IP address of the computing device.

As noted above, and as discussed in additional detail below, in some embodiments, the reflector 116 may be configured to route pairing and access requests from applications to capability proxies. The reflector 116 may be configured to do so when the application and the hardware resource are resident on the same computing device and/or when the application and the hardware resource are resident on different computing devices. In some embodiments, the reflector 116 may provide this routing functionality whenever a direct path between the application and the capability proxy managing the hardware resource is not available. In some embodiments, the reflector 116 may provide hardware capabilities not available on the computing device from which a request issues. For example, the reflector 116 may generate one-time passwords when this functionality is not available on another computing device, and in some embodiments, may simulate hardware-based one-time password generation techniques. Various embodiments of the reflector 116 are discussed below with reference to FIG. 2.

As indicated above, the remote computing device 102 may include a traffic server 120. The traffic server 120 may be configured to route signals between various components of the resource access management system 100. In some embodiments, the traffic server 120 may be an XMPP server, and may provide an Extensible Markup Language (XML)-based protocol for message passing. In some embodiments, the traffic server 120 may support any suitable traffic transport mechanisms, such as queues, websockets (which may provide full duplex communication over a Transmission Control Protocol (TCP) connection), and WebRTC, among others.

As indicated above, the remote computing device 102 may include an API management gateway 114. The API management gateway 114 may serve to manage APIs in the resource access management system 100. The API management gateway 114 may take the form of conventional API management gateways, and thus is not discussed in further detail.

The remote computing device 102 may include a number of additional components to support operation of the resource access management system 100. For example, in some embodiments, the remote computing device 102 may include a developer portal 108. The developer portal 108 may be implemented as one or more computing devices, and may be coupled with the API management gateway 114. The developer portal 108 may be configured to provide an API key to an application developer for use with the application. The API key may identify the application, and may be used by various components of the resource access management system 100 (e.g., by the reflector 116) to identify the application when the application provides a pairing request (and thus may be used to validate the identity of the application). In some embodiments, the API key may be used to identify the application for billing the application developer for use of the resource access management system 100 (e.g., by counting the number of tokens issued to applications associated with the API key).

In some embodiments, the remote computing device 102 may include a device profiler 110. The device profiler 110 may be implemented as one or more computing devices, and may be coupled to the reflector 116. The device profiler may be configured to allow authorized entities (e.g., an owner, as discussed below with reference to FIGS. 6 and 7) to manage access to one or more computing devices for which the authorized entities are responsible. For example, an entity responsible for a particular computing device may access the device profiler 110 to grant access to various hardware resources of the computing device to selected users of the resource access management system 100. In some embodiments, an authorized entity may store a setting in the device profiler 110 such that the device profiler 110 is configured to automatically approve a particular user for access to a particular hardware resource when the authorized entity has previously manually approved the particular user for access to the particular hardware resource. Authorized entities may be credentialed using login names and passwords, or any other suitable mechanism. The device profiler 110 may also be configured to manage the revocation of access permissions, and may store a list of all hardware resources to various computing devices available in the resource access management system 100.

Thus, in some embodiments, the device profiler 110 may provide a central repository for registration of hardware resources and storing access permissions for such resources. The device profiler 110 may be used in any of a number of ways, as indicated above. For example, an owner of a computing device may log in to the device profiler 110 and give permission for a friend's smartphone to access a storage device or other hardware resource of the computing device.

In some embodiments, the remote computing device 102 may include an identity broker 112. The identity broker 112 may be implemented as one or more computing devices, and may be coupled with the reflector 116 and with a third-party identity platform (not shown). The identity broker 112 may be configured to manage user credentials and perform other authentication functions for regulating use of the resource access management system 100 by various users. For example, in some embodiments, the identity broker 112 may allow a user to log in to the device profiler 110 using login information from another web service (e.g., social media login information, email login information, etc.). In some embodiments, the device profiler 110 and the identity broker 112 may, in conjunction, maintain the relationship between various computing devices and their owners, and may manage authorizations and revocations of permissions.

Figures 2, 3:
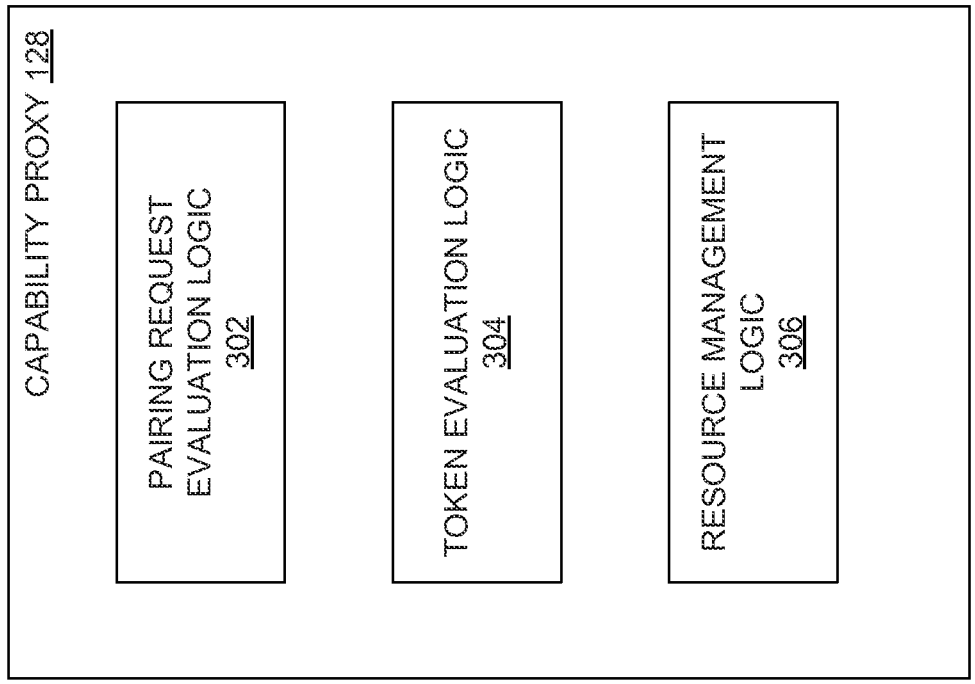
FIG. 2 is a block diagram of a reflector, which may be included in the resource access management system of FIG. 1, in accordance with various embodiments.
FIG. 3 is a block diagram of a capability proxy, which may be included in the resource access management system of FIG. 1, in accordance with various embodiments.

FIG. 2 is a block diagram of a reflector 116, which may be included in the remote computing device 102 of the resource access management system 100 of FIG. 1, in accordance with various embodiments.

The reflector 116 may include pairing request receipt logic 202. The pairing request receipt logic 202 may be configured to receive a pairing request from an application (e.g., the application 122 or the application 146). The pairing request may specify a particular hardware resource (e.g., the hardware resource 134 or the hardware resource 144) with which the application requests a pairing. The pairing request may specify a particular hardware resource by including an identifier of that hardware resource (e.g., a uniform resource name identifier generated in accordance with known schema, or a proprietary identifier). The hardware resource that is the subject of the pairing request may be remote from the reflector 116 (e.g., when the hardware resource is the hardware resource 134 or the hardware resource 144). A pairing request may include any other suitable information for aiding the reflector 116 and/or the computing device associated with the requested hardware resource (e.g., the capability proxy of the computing device) in determining whether or not to approve the pairing request. In some embodiments, the pairing request may also include an identifier of the application providing the pairing request, or information that may be used by the pairing request receipt logic 202 to identify the application. In some embodiments, the pairing request may be provided to the pairing request receipt logic 202 from the application via a stateless protocol message, such as a REST call.

The reflector 116 may include intermediary logic 204. The intermediary logic 204 may be coupled to the pairing request receipt logic 202, and may be configured to provide request data to the computing device associated with the requested hardware resource (e.g., to the capability proxy of the computing device). The request data may include an identifier of the hardware resource and an identifier of the application. As used herein, an "identifier of a hardware resource" may specify a particular hardware device (e.g., a sensor) or a particular capability of a hardware device with multiple capabilities (e.g., an acceleration measurement along a first axis generated by a multi-axis accelerometer). The request data may include any other suitable information for aiding the associated computing device (e.g., the capability proxy of the computing device) in determining whether or not to approve the pairing request. For example, in some embodiments, the request data may include an IP address of the application. In some embodiments, the intermediary logic 204 may be configured to provide an IP address of the associated computing device to the computing device (e.g., along with or separately from the request data). In some embodiments, the request data may be provided to the associated computing device via a stateless protocol message, such as a REST call.

The intermediary logic 204 may also be configured to receive a pairing approval or a pairing denial from the associated computing device (e.g., from the capability proxy of the computing device). The pairing approval or pairing denial may be generated by the associated computing device (e.g., by the capability proxy of the computing device) based on at least some of the request data provided to the associated computing device by the intermediary logic 204. In some embodiments, the pairing approval or pairing denial may be provided to the intermediary logic 204 via a stateless protocol message, such as a REST call.

The reflector 116 may include token generation logic 206. The token generation logic 206 may be coupled with the intermediary logic 204, and may be configured to generate a pairing token for provision to the application in response to receipt of a pairing approval from the associated computing device (e.g., from the capability proxy of the computing device). As discussed in further detail below, the application may receive the pairing token and may provide the pairing token to the associated computing device (e.g., to the capability proxy of the computing device) to pair with the hardware resource. In some embodiments, the pairing token may be provided to the application via a stateless protocol message, such as a REST call. In some embodiments, the application may provide the pairing token to the associated computing device via a stateless protocol message, such as a REST call.

In some embodiments, the token generation logic 206 may be configured to generate tokens other than the pairing token. For example, the token generation logic 206 may be coupled to the pairing request receipt logic 202, and may be configured to generate a temporary token for provision to the application in response to receipt of the pairing request from the application. As discussed in further detail below, the application may receive the temporary token and may provide the temporary token to the associated computing device (e.g., to the capability proxy of the computing device) to trigger a request from the associated computing device to the intermediary logic 204 for the request data. In some embodiments, the request from the computing device to the intermediary logic 204 for the request data may include the temporary token provided by the application to the associated computing device. In some embodiments, the token generation logic 216 may be configured to provide the temporary token to the application via a stateless protocol message, such as a REST call. In some embodiments, the application may provide the temporary token to the associated computing device via a stateless protocol message, such as a REST call.

In some embodiments, the token generation logic 206 may be configured not to generate the pairing token unless the reflector 116 has received the temporary token from the application and the intermediary logic has received a pairing approval from the associated computing device (e.g., from the capability proxy of the computing device). In some such embodiments, once these conditions are satisfied, the token generation logic 206 may provide the pairing token to the application (e.g., via a stateless protocol message, such as a REST call). In some embodiments, the application may provide the temporary token to the reflector 116 (e.g., the pairing request receipt logic 202) via a stateless protocol message, such as a REST call.

FIG. 3 is a block diagram of a capability proxy 128, which may be included in the computing device 104 of the resource access management system 100 of FIG. 1, in accordance with various embodiments. As noted above with reference to FIG. 1, although the following discussion may focus on communication between the reflector 116 and the capability proxy 128 when another computing device desires access to the hardware resource 134, this is simply for ease of illustration, and analogous logic may be included in the capability proxy 138 (and capability proxies included in other computing devices whose hardware resources are managed by the resource access management system 100).

The capability proxy 128 may include pairing request evaluation logic 302. The pairing request evaluation logic 302 may be configured to receive request data from the reflector 116 of the remote computing device 102. As discussed above with reference to the intermediary logic 204 of the reflector 116, the request data may include an identifier of the hardware resource 134 of the computing device 104. The request data may also include an identifier of an application (e.g., the application 122 or the application 146) that has provided a pairing request to the reflector 116 for pairing with the hardware resource. In some embodiments, the pairing request evaluation logic 302 may receive the request data via a stateless protocol message, such as a REST call.

The pairing request evaluation logic 302 may also be configured to provide an approval or a denial of the pairing request to the reflector 116 in response to receipt of the request data. In some embodiments, the pairing request evaluation logic 302 may be configured to provide the approval or the denial to the reflector 116 via a stateless protocol message, such as a REST call.

The capability proxy 128 may include token evaluation logic 304. The token evaluation logic 304 may be configured to receive an access request from the application for access to the hardware resource 134. The access request may include a pairing token that was generated and provided to the application by the reflector 116 in the response to receipt by the reflector 116 of an approval of the pairing request (provided by the pairing request evaluation logic 302). In some embodiments, the token evaluation logic 304 may be configured to receive the access request via a stateless protocol message, such as a REST call.

The token evaluation logic 304 may also be configured to validate or invalidate a received pairing token. For example, in embodiments in which the application requesting access to the hardware resource 134 purports to be local to the computing device 104, the token evaluation logic 304 may be configured to validate the pairing token if an IP address of the application matches an IP address of the computing device 104 (and invalidate the pairing token otherwise). In some embodiments, the token evaluation logic 304 may be configured to validate the pairing token if the pairing token includes a correct identifier for the computing device 104 (and invalidate the pairing token otherwise).

The capability proxy 128 may include resource management logic 306. The resource management logic 306 may be coupled with the token evaluation logic 304 and may be configured to provide access to the hardware resource 134 to the application in response to validation of the pairing token by the token evaluation logic 304. Providing access to the hardware resource 134 may include providing data from the hardware resource for provision to the application, for example. In some such embodiments, the resource management logic 306 may be configured to provide the data from the hardware resource 134 to the application via a stateless protocol message, such as a REST call.

In some embodiments, the capability proxy 128 may have a pluggable architecture. For example, the capability proxy 128 may include capability plugins that may be dynamically installed. These may be developed by any suitable source (e.g., hardware or platform manufacturers, original equipment manufacturers, third parties, etc.) and may each provide access to a particular functionality or functionalities (e.g., GPS functionality, one-time password functionality, etc.).

Figure 4:
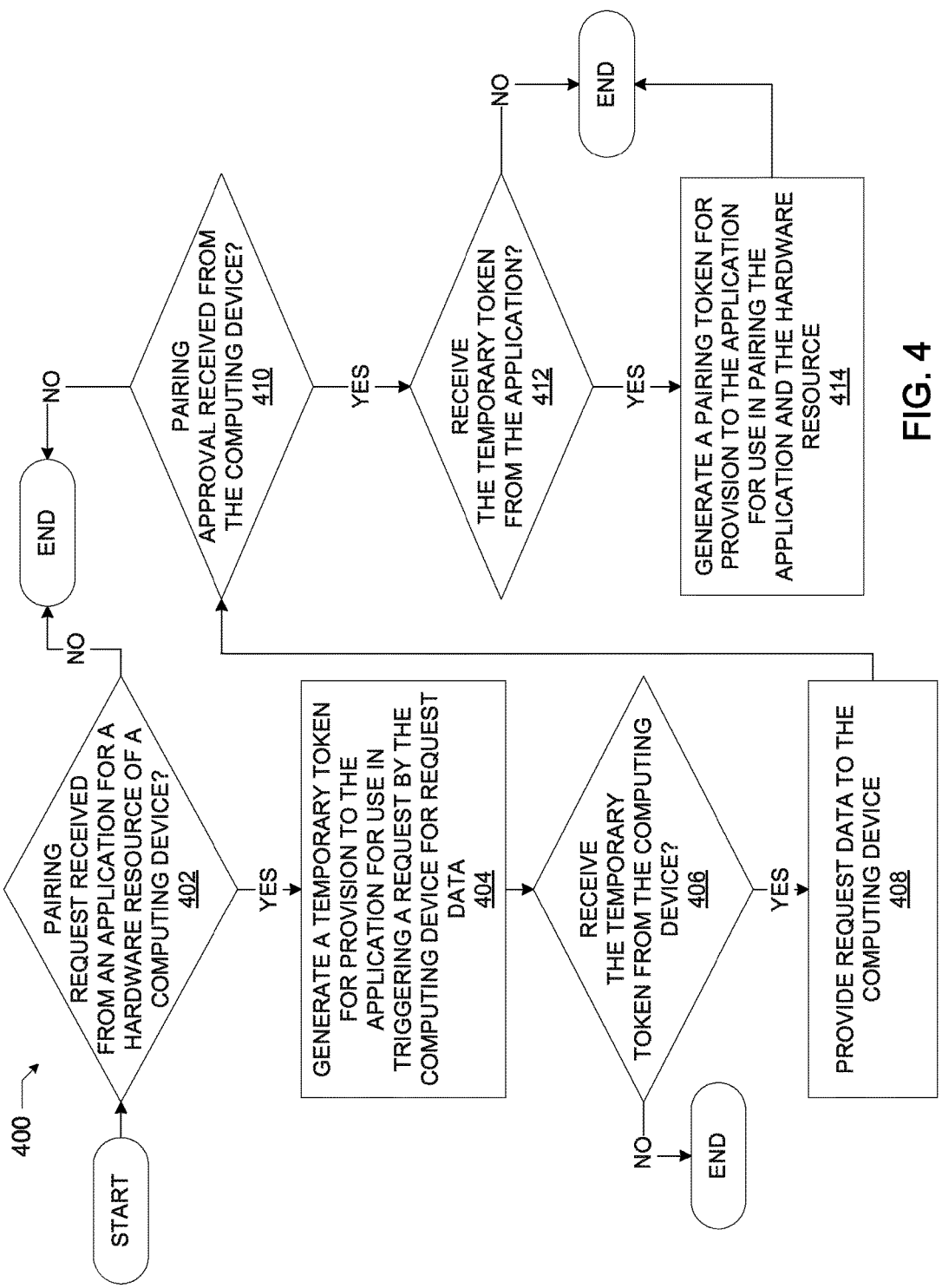
FIG. 4 is a flow diagram of a process for regulating pairing with hardware resources, in accordance with various embodiments.

FIG. 4 is a flow diagram 400 of a process for regulating pairing with hardware resources, in accordance with various embodiments. For ease of illustration, the operations discussed below with reference to the flow diagram 400 may be principally described as performed by the reflector 116 of the resource access management system 100 to regulate pairing between the application 122 and the hardware resource 134 of the computing device 104. However, any suitable computing device or devices may perform the operations with respect to any suitable application and hardware resource. In particular, the following discussion may apply to embodiments in which the reflector 116 performs the operations of the flow diagram 500 to regulate access by the application 122 to the hardware resource 144 of the computing device 106. The operations discussed below with reference to the flow diagram 400 may take the form of any of the embodiments disclosed herein (e.g., as discussed above with reference to FIG. 1 and FIG. 3).

The flow diagram 400 may begin at 402, in which the reflector 116 (e.g., the pairing request receipt logic 202) may determine whether a pairing request has been received from the application 122 for pairing with the hardware resource 134. In some embodiments, the pairing request may be received via a stateless protocol message, such as a REST call. If the reflector 116 determines at 402 that no pairing request has been received, the process may then end.

If the reflector 116 determines at 402 that a pairing request has been received, the reflector 116 (e.g., the token generation logic 206) may proceed to 404 and may generate and provide a temporary token for provision to the application 122. In some embodiments, the temporary token may be provided via a stateless protocol message, such as a REST call. The application 122 may provide the temporary token to the computing device 104 (e.g., to the capability proxy 128) to trigger the computing device 104 to provide (e.g., via a stateless protocol message, such as a REST call) a request for request data to the reflector 116. In some embodiments, the request for the request data may include the temporary token. Thus, at 406, the reflector 116 (e.g., the intermediary logic 204) may determine whether the temporary token has been received from the computing device 104 (e.g., from the capability proxy 128) as part of a request for request data. If the reflector 116 determines at 406 that no request for request data has been received, the process may then end. If the reflector 116 determines at 406 that the temporary token has been received as part of a request for request data, the reflector 116 may proceed to 408. In some embodiments, the reflector 116 may not be configured to generate and receive a temporary token, and thus the operations discussed above with reference to 404 and 406 may not be performed.

At 408, the reflector 116 (e.g., the intermediary logic 204) may provide request data to the computing device 102. In some embodiments, the request data may be provided via a stateless protocol message, such as a REST call. As discussed above, the request data may include an identifier of the application 122 and identifier of the hardware resource 134.

At 410, the reflector 116 (e.g., the intermediary logic 204) may determine whether a pairing approval has been received from the computing device 104, approving the pairing request between the application 122 and the hardware resource 134. In some embodiments, the indicator of pairing approval may be received via a stateless protocol message, such as a REST call. If the reflector 116 determines at 410 that a pairing approval has not been received (e.g., when a pairing denial has been received, or when the computing device 104 does not respond to the request data), the process may then end.

If the reflector 116 determines at 410 that a pairing approval has been received, the reflector 116 (e.g., the token generation logic 206) may proceed to 412 and determine whether the temporary token has been received from the application 122. In some embodiments, the temporary token may be received via a stateless protocol message, such as a REST call. If the reflector 116 determines at 412 that the temporary token has not been received from the application 122, the process may then end.

If the reflector 116 determines at 412 that the temporary token has been received from the application 122, the reflector 116 (e.g., the token generation logic 206) may proceed to 414 and may generate a pairing token for provision to the application 122 for use in pairing the application 122 and the hardware resource 134. In some embodiments, the token generation logic 206 may provide the temporary token to the application 122 (e.g., via a stateless protocol message, such as a REST call). The process may then end. In embodiments in which the reflector 116 is not configured to generate or use a temporary token, the operations discussed above with reference to 412 may not be performed.

Figure 5:
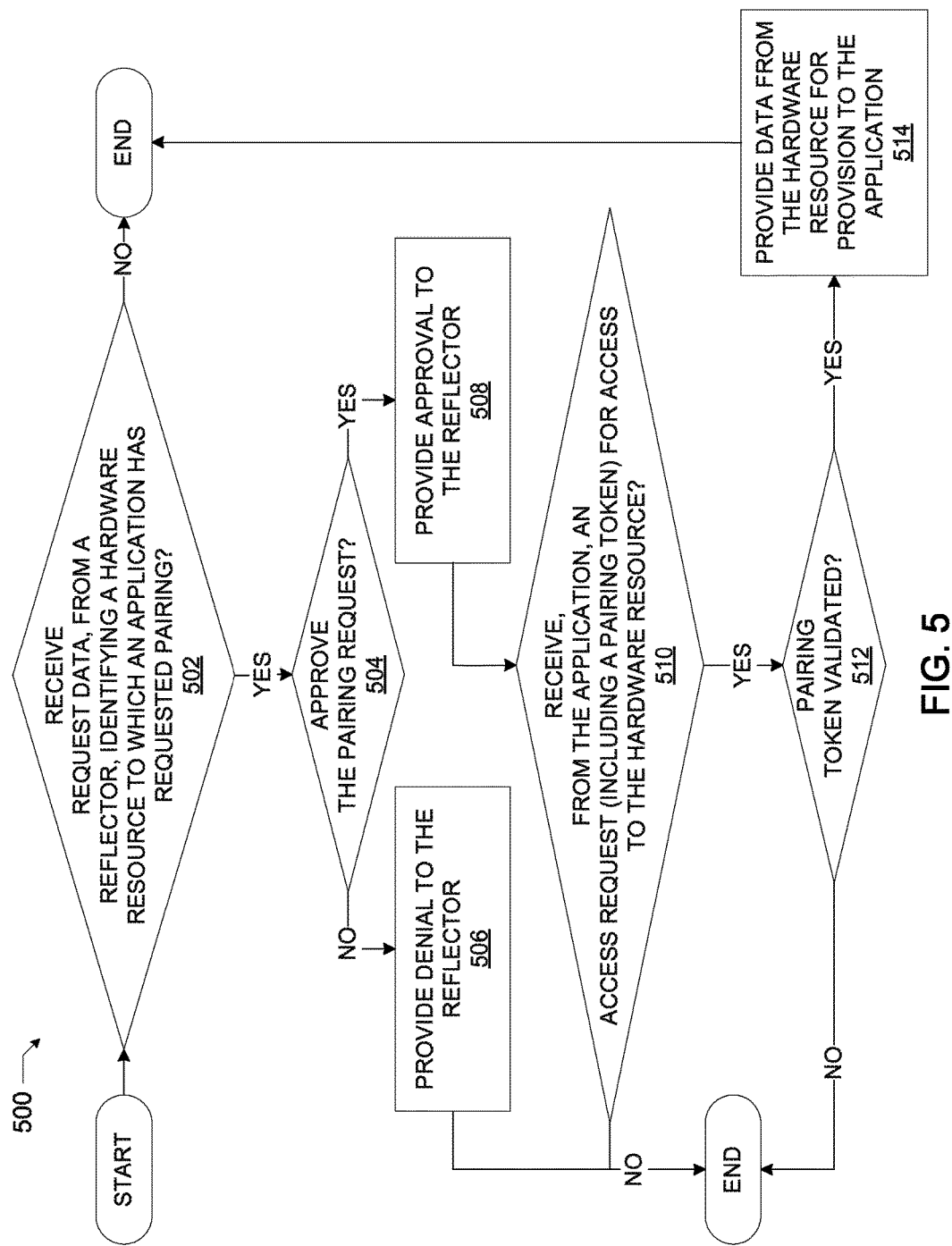
FIG. 5 is a flow diagram of a process for regulating access to hardware resources, in accordance with various embodiments.

FIG. 5 is a flow diagram 500 of a method for regulating access to hardware resources, in accordance with various embodiments. For ease of illustration, the operations discussed below with reference to the flow diagram 500 may be principally described as performed by the capability proxy 128 of the computing device 104, in communication with the reflector 116, to regulate access by the application 122 to the hardware resource 134. However, any suitable computing device or devices may perform the operations with respect to any suitable application and hardware resource. In particular, the following discussion may apply to embodiments in which the capability proxy 138 performs the operations of the flow diagram 500 to regulate access by the application 146 to the hardware resource 144. The operations discussed below with reference to the flow diagram 500 may take the form of any of the embodiments disclosed herein (e.g., as discussed above with reference to FIG. 1 and FIG. 3).

The flow diagram 500 may begin at 502, at which the capability proxy 128 (e.g., the pairing request evaluation logic 302) may determine whether request data has been received from the reflector 116. In some embodiments, the request data may be received via a stateless protocol message, such as a REST call. As discussed above, the request data may include an identifier of the hardware resource 134 and an identifier of the application 122, which has requested pairing with the hardware resource 134 via a pairing request provided to the reflector 116 (e.g., via a stateless protocol message, such as a REST call). In some embodiments, the request data may be provided to the capability proxy 128 from the reflector 116 as discussed above with reference to 402-408 of FIG. 4 (e.g., in response to a pairing request received by the reflector 116 from the application 122).

At 504, the capability proxy 128 (e.g., the pairing request evaluation logic 302) may determine whether to approve the pairing request. Approval or denial may be based on any suitable criteria stored in a storage device accessible by the capability proxy 128, such as a predetermined hardware resource use policy, the current demand on the hardware resource, the identity of the requesting application, an expected schedule for the hardware resource, and available power supply for the hardware resource, or any other suitable criteria. If the capability proxy 128 determines at 504 not to approve the pairing request, the capability proxy 128 (e.g., the pairing request evaluation logic 302) may provide a denial to the reflector 116 at 506 (e.g., via a stateless protocol message, such as a REST call), and the process may then end.

If the capability proxy 128 determines at 504 to approve the pairing request, the capability proxy 128 (e.g., the pairing request evaluation logic 302) may provide an approval to the reflector 116 at 508. In some embodiments, the approval may be provided via a stateless protocol message, such as a REST call.

At 510, the capability proxy 128 (e.g., the token evaluation logic 304) may determine whether an access request has been received from the application 122. In some embodiments, the access request may be received via a stateless protocol message, such as a REST call. An access request may include a pairing token, generated by the reflector 116 and provided to the application 122 (e.g., in accordance with the operations discussed above with reference to 414 of FIG. 4). If the capability proxy 128 determines at 510 that no access request has been received from the application 122, the process may then end.

If the capability proxy 128 determines at 510 that an access request has been received from the application 122, the capability proxy 128 (e.g., the token evaluation logic 304) may proceed to 512 and determine whether to validate the pairing token (included in the access request of 510). The token evaluation logic 304 may use any desired criteria to determine whether to validate the pairing token, such as the criteria discussed above with reference to the token evaluation logic 304 of FIG. 3). If the capability proxy 128 determines at 512 not to validate the pairing token, the process may then end.

If the capability proxy 128 determines at 512 to validate the pairing token, the capability proxy 128 (e.g., the resource management logic 306) may proceed to 514 and provide data from the hardware resource 134 for provision to the application 122. In some embodiments, the data may be provided via a stateless protocol message, such as a REST call. In some embodiments, the capability proxy 128 may provide the data directly to the application 122. In other embodiments, the capability proxy 128 may provide the data to the reflector 116 or another intermediate computing device, which may then provide data to the application 122. The process may then end.

FIGS. 6-10 are signal flow diagrams of an example of the exchange of various signals between components of the resource access management system 100 during use. FIGS. 6-10 may represent signals exchanged in accordance with the flow diagrams discussed above with reference to FIGS. 4 and 5. The signals depicted in FIGS. 6-10 are illustrated as REST signals, but as noted above, any suitable protocol may be used in various embodiments.

Figure 6:
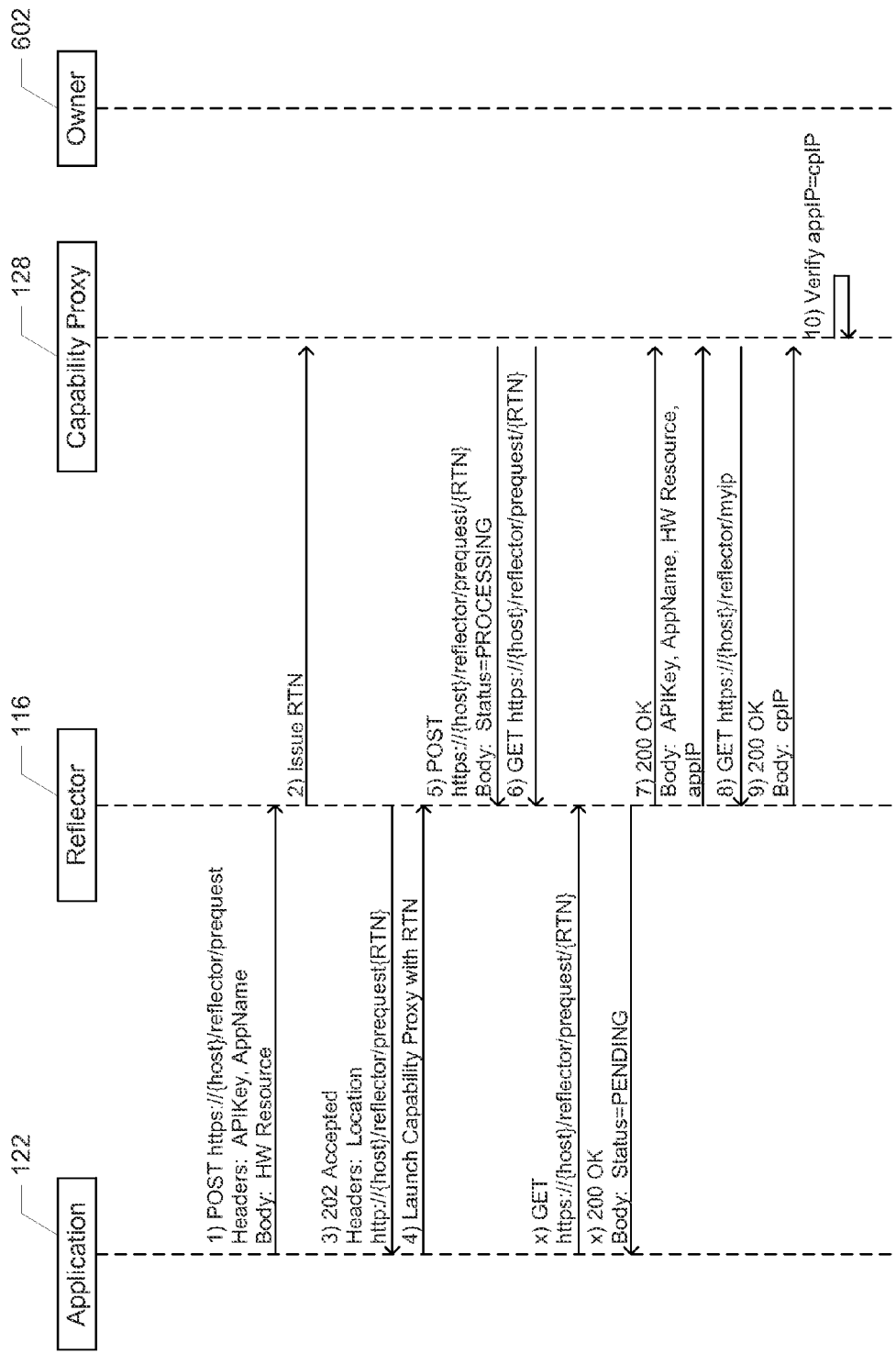
FIGS. 6 and 7 are signal flow diagrams of the exchange of various signals between components of the resource access management system of FIG. 1 for regulating pairing between an application and a hardware resource, in accordance with various embodiments.
Figure 7:
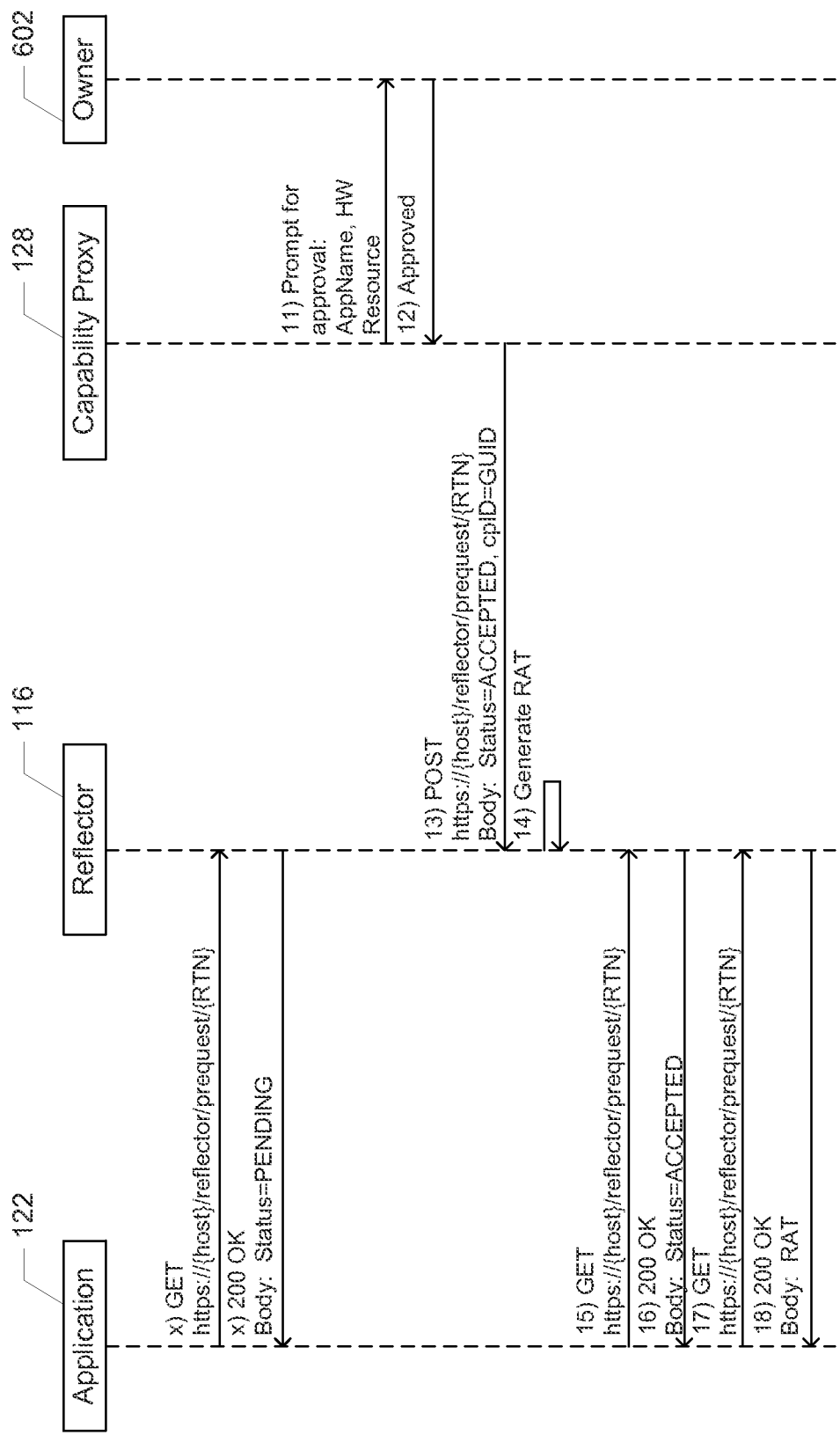

FIGS. 6 and 7 are signal flow diagrams 600 and 700, respectively, of the exchange of various signals between components of the resource access management system 100 for regulating pairing between an application and a hardware resource, in accordance with various embodiments. For ease of illustration, the signals illustrated in FIGS. 6 and 7 represent example signals that may be exchanged when the application 122 of the computing device 104 wishes to pair with the hardware resource 134 of the computing device 104. However, this is simply illustrative, and analogous signals may be exchanged when the application 122 wishes to pair with the hardware resource 144 of the computing device 106, or when the application 146 wishes to pair with the hardware resource 134 or the hardware resource 144, for example.

FIGS. 6 and 7 include signals exchanged between the application 122, the reflector 116, the capability proxy 128, and an owner 602. The owner 602 may be a user or administrator of the computing device associated with the requested hardware resource (e.g., the computing device 104) or may be an administrative or control application executing on the computing device 104. A human or automated owner 602 may determine whether to approve pairing requests or deny pairing requests based on any desired criteria, such as a predetermined hardware resource use policy, the current demand on the hardware resource, the identity of the requesting application, an expected schedule for the hardware resource, and available power supply for the hardware resource, or any other suitable criteria. In some embodiments, the functionality of the owner 602 may be included in the capability proxy 128.

The signal flow exchange of FIG. 6 may begin with a pairing request POST call from the application 122 to the reflector 116. The pairing request POST call may include an identifier of the application 122 (e.g., the AppName data in the header) and may include an API key (e.g., as discussed above with reference to the developer portal 108). A body of the pairing request POST call may include an identifier of the hardware resource 134 (e.g., the HW Resource data in the body).

In response to receiving the pairing request POST call, the reflector 116 may store the data of the pairing request POST call, issue a pairing request identifier (e.g., the routing ticket number, RTN), and may respond to the pairing request POST call with the pairing request identifier for later use by the application 122, as discussed below. The RTN may be, for example, a unique string of characters of a predetermined size (e.g., a 128 bit number), or any other suitable format. In some embodiments, the pairing request identifier (e.g., the RTN) may serve as a temporary token, as discussed above.

In response to receiving the pairing request identifier, the application 122 may use the pairing request identifier to launch the capability proxy 128. In some embodiments, the application 122 may launch the capability proxy 128 by causing the capability proxy 128 to establish a connection with the reflector 116. In contexts in which the capability proxy 128 is already connected to the reflector 116, the application 122 may not launch the capability proxy 128. Once launched, the capability proxy 128 may provide a POST call to the reflector 116, identifying the pairing request identifier and indicating that the capability proxy 128 is currently processing the pairing request (e.g., as indicated by the Status data in the body of the POST call). The capability proxy 128 may also provide a GET call to the reflector 116, identifying the pairing request identifier, to get all of the data stored by the reflector 116 about the pairing request (e.g., the identifier of the associated application, the identifier of the associated hardware resource, etc.).

Intermittently, after providing the pairing request POST call as discussed above, the application 122 may query the reflector 116 to check on the status of the pairing request. The status checks may take the form indicated by the signals labeled "x" in FIGS. 6 and 7, and may include providing a GET call to the reflector 116 (including the pairing request identifier) and receiving a response from the reflector 116 indicating status of the pairing request (e.g., the status PENDING in the body of the response).

In response to receiving the GET call from the capability proxy 128 (represented by the signal labeled "6"), the reflector 116 may respond with the data about the pairing request. This data may include data provided by the application 122 with the pairing request (e.g., the AppName, APIKey, and HW Resource). This data may also include data generated by the reflector 116. For example, the reflector 116 may determine an IP address from which the pairing request originated, and may provide that information to the capability proxy 128 (e.g., the appIP in the body of the response).

If the capability proxy 128 desires additional information, capability proxy 128 may request that information from the reflector 116. For example, the capability proxy 128 may provide a GET call to the reflector 116 to request the IP address of the capability proxy 128 itself (represented by the signal labeled "8"). In response, the reflector 116 may provide the IP address of the capability proxy 128 (e.g., the cpIP in the body of the response). The capability proxy 128 may compare the IP address of the application 122 and the IP address of the capability proxy 128 to determine if the two IP addresses are the same.

In embodiments in which the capability proxy 128 is configured to only allow access to the hardware resource 134 from applications that execute on the computing device 104, this check may confirm that the application 122 indeed executes on the computing device 104, and may be a prerequisite to continuing with the pairing process. If this comparison fails, the capability proxy 128 may transmit a denial signal to the reflector 116 (not shown in FIG. 6). In embodiments in which the capability proxy 128 is configured to allow access to the hardware resource 134 from applications that execute on computing devices other than the computing device 104 (e.g., from the application 146, which executes on the computing device 106), the capability proxy 128 may not perform this comparison, and thus the capability proxy 128 may not request IP information from the reflector 116.

The signal flows represented by FIG. 6 continue in FIG. 7. As shown, the application 122 may perform another status check (as indicated by the signals labeled "x," and as discussed above).

If the capability proxy 128 determines that the IP address of the application 122 matches the IP address of the capability proxy 128 (if such a determination is required), the capability proxy 128 may prompt the owner 602 for approval of the pairing request. This prompt may identify the application requesting the pairing (e.g., the application 122), the computing device associated with the application (e.g., if the computing device is different from the computing device on which the capability proxy 128 executes), the particular hardware resource requested (e.g., the hardware resource 134), or any other information about the pairing request that the owner 602 may find helpful in determining whether or not to approve the pairing request. The prompt may take the form of an on-screen message (e.g., on a display device associated with the computing device 104), an electronic message (e.g., a text message or email transmitted to another device associated with the owner 602), a signal transmitted purely internally to the computing device 104 and used by an automated owner 602 to determine whether or not to approve the pairing request.

If the owner 602 determines the pairing request is to be denied, the owner 602 may provide a denial signal to the capability proxy 128 (not shown). If the owner 602 approves the pairing request, the owner 602 may provide an approval signal to the capability proxy 128. In response to receiving the approval of the pairing request, the capability proxy 128 may provide a POST call to the reflector 116, indicating that the pairing request has been approved (e.g., the ACCEPTED status in the body).

The POST call may also include an identifier of the capability proxy 128 (e.g., the cpID=GUID data in the body) that may be used by the reflector 116 in generating a token for use by the application 122 when requesting access to the hardware resource 134 (e.g., as discussed below with reference to FIGS. 8-10). In some embodiments, the identifier of the capability proxy 128 may be a global unique identifier of the capability proxy 128 in the sense that it may uniquely identify the capability proxy 128 within the resource access management system 100. If the token is generated based on an identifier of the capability proxy 128 (e.g., signed by such an identifier), the capability proxy 128 may be able to determine whether a token presented to the capability proxy 128 was indeed provided by the reflector 116 so the application 122 could access the capability proxy 128; if the token fails this check, the token may be invalid. In some embodiments, the token may have a set of attributes and values, as well as a signature; the identifier of the capability proxy 128 may be one of the attributes. In some embodiments, a token may be valid for one access or more than one access. In some embodiments, the token may be valid for a particular window of time (e.g., 90 minutes or one year), after which it may be invalid. In some embodiments, a token may be renewable by the reflector 116 and/or the capability proxy 128. This token expiration information may be encoded in the token itself for use by the capability proxy 128 in determining whether or not to validate the token. The reflector 116 may then generate the token (e.g., the RAT of the operation labeled "14").

When the application 122 next performs a status check (as indicated by the signal labeled "15"), the reflector 116 may respond by indicating that the pairing request has been approved (e.g., the ACCEPTED status in the body). Upon receipt of the status information, the application 122 may provide a GET call to the reflector 116, including the pairing request identifier, to which the reflector 116 may respond by providing the application 122 with the token (e.g., in the body of the response). This may complete the pairing between the application 122 and the hardware resource 134.

After a pairing request has been approved, an application may seek additional information about the hardware resource with which it is now paired. In some embodiments, the reflector 116 may provide this information to the application. This information may take the form of metadata about the hardware resource, and may be used by the application to enable a schema to be able to fail early (e.g., via an SDK), determine whether the hardware resource supports some events instead of pooling, and/or determine the type of the hardware resource, for example. FIG. 8 is a signal flow diagram 800 of the exchange of various signals between components of the resource access management system 100 of FIG. 1 for exchanging hardware resource metadata, in accordance with various embodiments. For ease of illustration, the signals illustrated in FIGS. 8-10 represent example signals that may be exchanged when the application 122 of the computing device 104 wishes to access the hardware resource 134 of the computing device 104 after pairing. However, this is simply illustrative, and analogous signals may be exchanged when the application 122 wishes to access the hardware resource 144 of the computing device 106, or when the application 146 wishes to access the hardware resource 134 or the hardware resource 144, for example.

Figure 8:
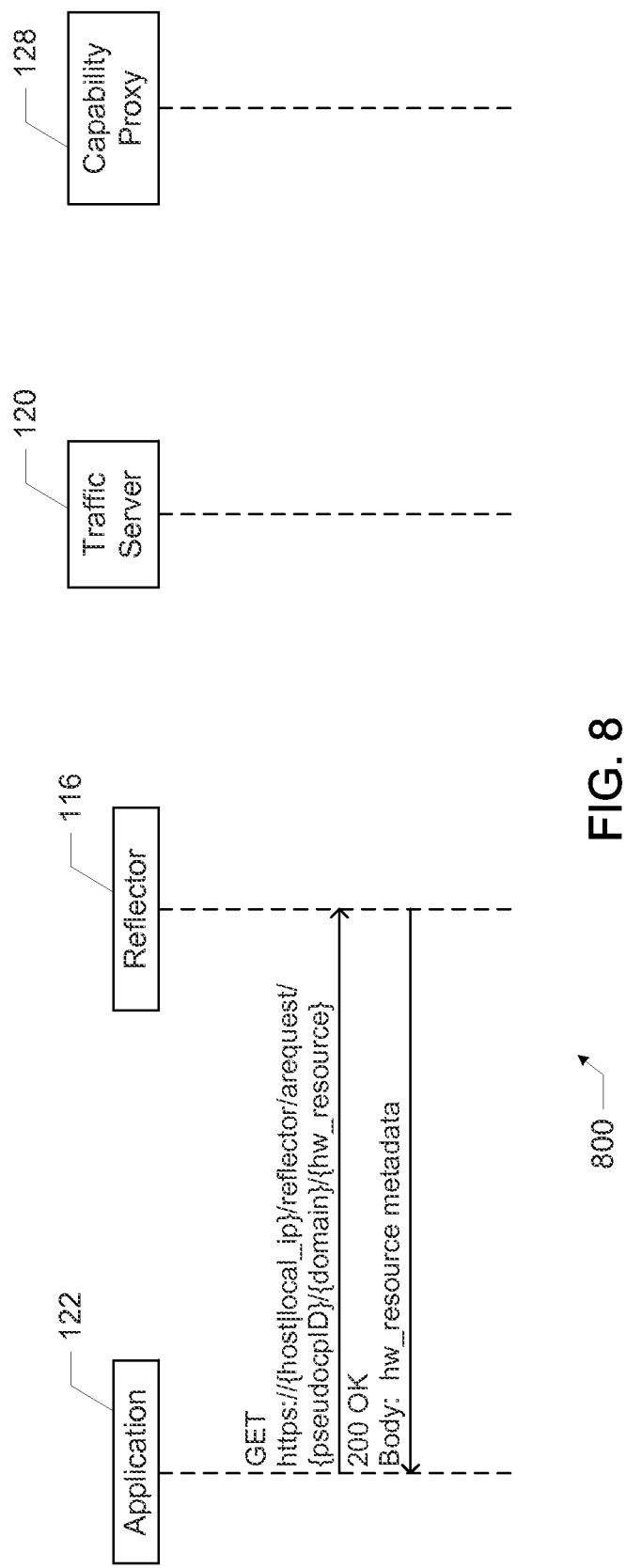
FIG. 8 is a signal flow diagram of the exchange of various signals between components of the resource access management system of FIG. 1 for exchanging hardware resource metadata, in accordance with various embodiments.

As shown in FIG. 8, the application 122 may provide a GET call to the reflector 116, specifying that the application 122 wishes to make an access request (arequest) of the hardware resource 134 (hw_resource) associated with the capability proxy 128. In some embodiments, the GET call may identify the capability proxy 128 that manages access to the hardware resource 134. This identification may take the form of a pseudo-identifier, which may not be a global unique identifier as discussed above with reference to the generation of the token by the reflector 116 in FIG. 7. In some embodiments, the pseudo-identifier may be provided to the application 122 by the reflector 116 upon approval of the pairing request (not shown), and the use of the pseudo-identifier may protect the global unique identifier of the capability proxy 128 from misuse. The reflector 116 may be configured to recognize the pseudo-identifier and determine with which capability proxy it is associated. In some embodiments, the GET call may identify the domain (domain) of the hardware resource. A domain may be a namespace for grouping related device capabilities. For example, "Domain=Sensors" may group all hardware sensors of a computing device, while "Domain=Security" may group all hardware security capabilities of the computing device.

In response to the GET call from the application 122, the reflector 116 may provide metadata descriptive of the hardware resource 134 (e.g., in the body). Examples of metadata may include schemas (e.g., an optional parameter describing a configuration of the hardware resource 134) and 10 (e.g., a list of input/output communication mechanisms, such as "events," istream, ostream, iostream, etc.).

Figure 9:
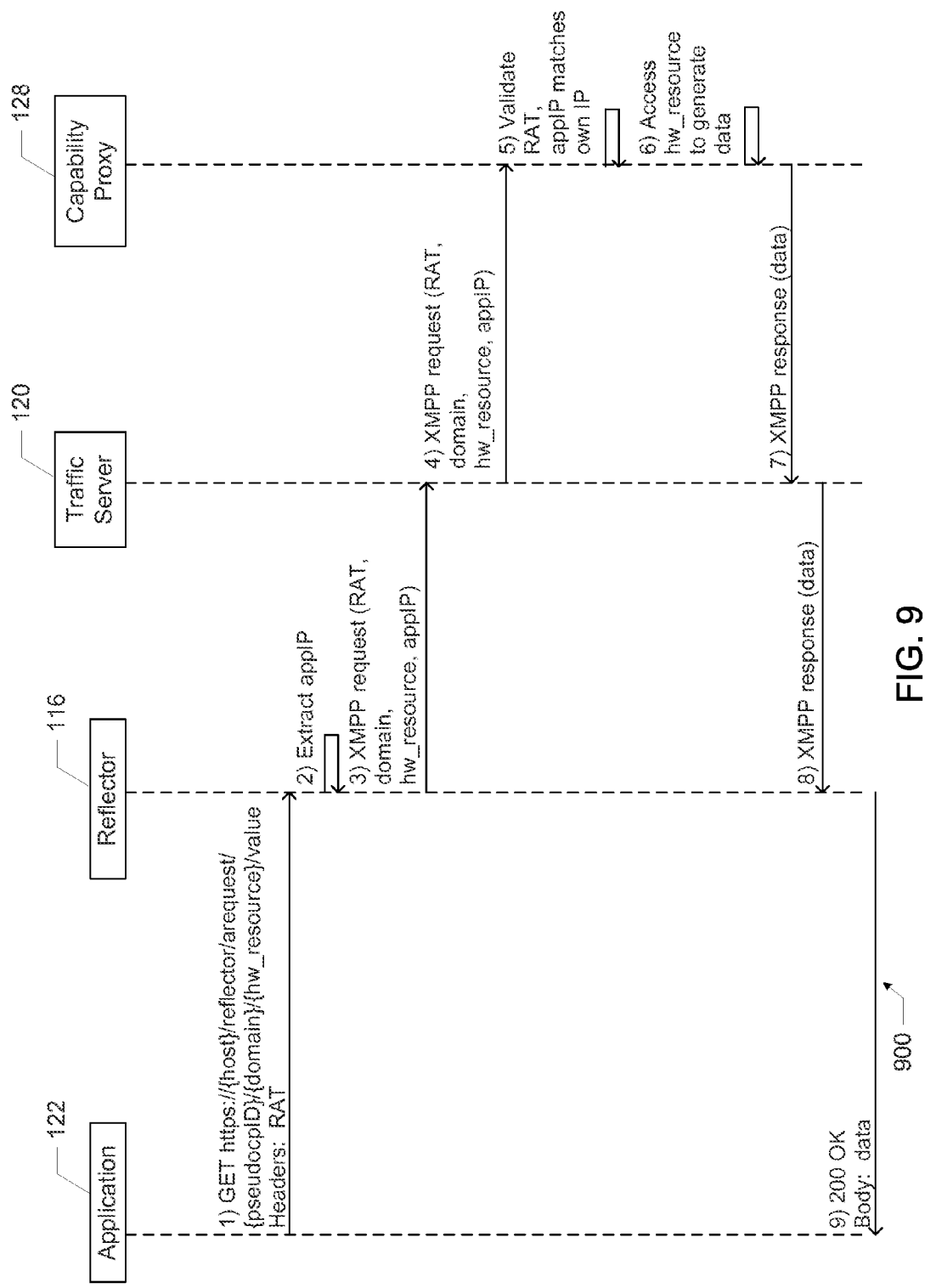
FIGS. 9-10 are signal flow diagrams of the exchange of various signals between components of the resource access management system of FIG. 1 for regulating access to a hardware resource by an application, in accordance with various embodiments.
Figure 10:
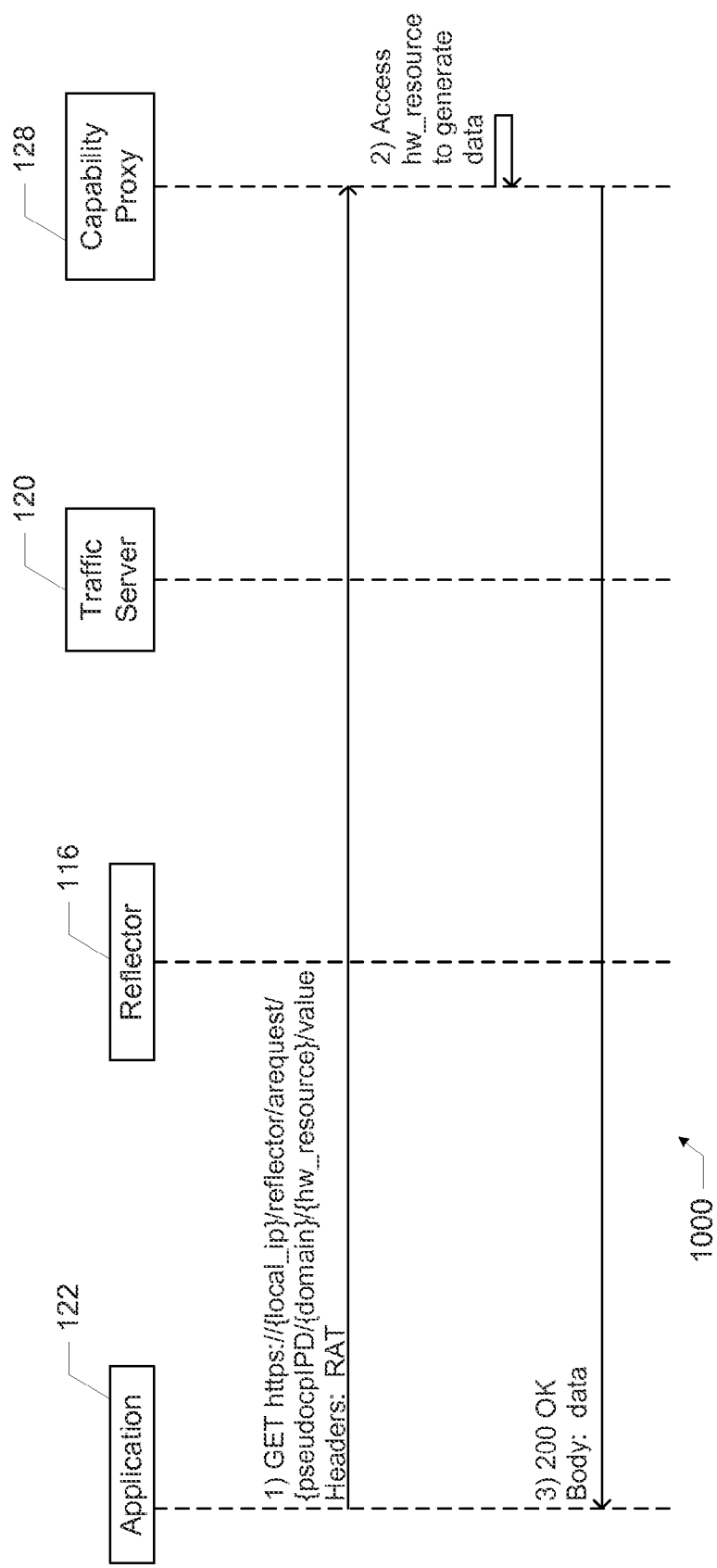

FIGS. 9-10 are signal flow diagrams 900 and 1000, respectively, of the exchange of various signals between components of the resource access management system 100 of FIG. 1 for regulating access to a hardware resource by an application, in accordance with various embodiments. As noted above, for ease of illustration, the signals illustrated in FIGS. 9-10 represent example signals that may be exchanged when the application 122 of the computing device 104 wishes to access the hardware resource 134 of the computing device 104 after pairing. However, this is simply illustrative, and analogous signals may be exchanged when the application 122 wishes to access the hardware resource 144 of the computing device 106, or when the application 146 wishes to access the hardware resource 134 or the hardware resource 144, for example.

In particular, FIG. 9 is a signal flow diagram 900 of the exchange of various signals for regulating access by the application 122 to the hardware resource 134 via the reflector 116 and the traffic server 120. The application 122 may provide a GET call to the reflector 116, specifying that the application 122 wishes to make an access request (arequest) of the hardware resource 134 (hw_resource) associated with the capability proxy 128, and that the application 122 requests data from the hardware resource 134 (value). The GET call may include the token (e.g., RAT in the header) provided to the application 122 by the reflector 116, as discussed above with reference to FIG. 7.

Upon receiving the GET call from the application 122, the reflector 116 may extract an IP address of the application 122, and may provide the extracted IP address, the token, the domain, and the identifier of the hardware resource 134 in an XMPP request to the traffic server 120. In response, the traffic server 120 may forward the XMPP request to the capability proxy 128. In general, the traffic server 120 may be responsible for handling communication with the capability proxy 128 using the best available protocol.

Upon receipt of the XMPP request, the capability proxy 128 may validate the token (e.g., using any of the validation techniques discussed above, or any other suitable validation technique), and if desired, confirm that the IP address of the application 122 matches the IP address of the capability proxy 128 (e.g., as discussed above with reference to FIG. 6). If these checks fail, the capability proxy 128 may provide a denial signal to the reflector 116 (e.g., via the traffic server 120) (not shown).

Upon validation of the token, the capability proxy 128 may access the hardware resource 134 to generate the data requested by the application 122. For example, if the hardware resource 134 is a sensor, the capability proxy 128 may access the sensor and retrieve sensor-generated data for provision to the application 122. The capability proxy 128 may provide the data to the traffic server 120 in response to the XMPP request from the traffic server 120, and the traffic server 120 may provide data to the reflector 116 in response to the XMPP request from the reflector 116. The reflector 116 may then, in turn, respond to the initial GET call by providing the data to the application 122 (e.g., in the body). In this manner, the application 122 may access the hardware resource 134.

In some embodiments, once pairing has been achieved, an application may access the hardware resource with which it is paired without going through the reflector 116 and/or the traffic server 120. Instead, in some embodiments, the application may communicate directly with the associated capability proxy. This communication may take place via an embedded web server (EWS) pathway, for example. FIG. 10 is a signal flow diagram 1000 of the exchange of various signals regulating access by the application 122 to the hardware resource 134, without going through the reflector 116 or the traffic server 120.

The application 122 may provide a GET call to the capability proxy 128, specifying that the application 122 wishes to make an access request (arequest) of the hardware resource 134 (hw_resource) associated with the capability proxy 128, and that the application 122 requests data from the hardware resource 134 (value). The GET call may include the token (e.g., RAT in the header) provided to the application 122 by the reflector 116, as discussed above with reference to FIG. 9. Upon receiving the GET call, the capability proxy 128 may access the hardware resource 134 to generate the data, as discussed above with reference to FIG. 9, and may provide data to the application 122 in response to the GET call. In this manner, the application 122 may access the hardware resource 134.

Figure 11:
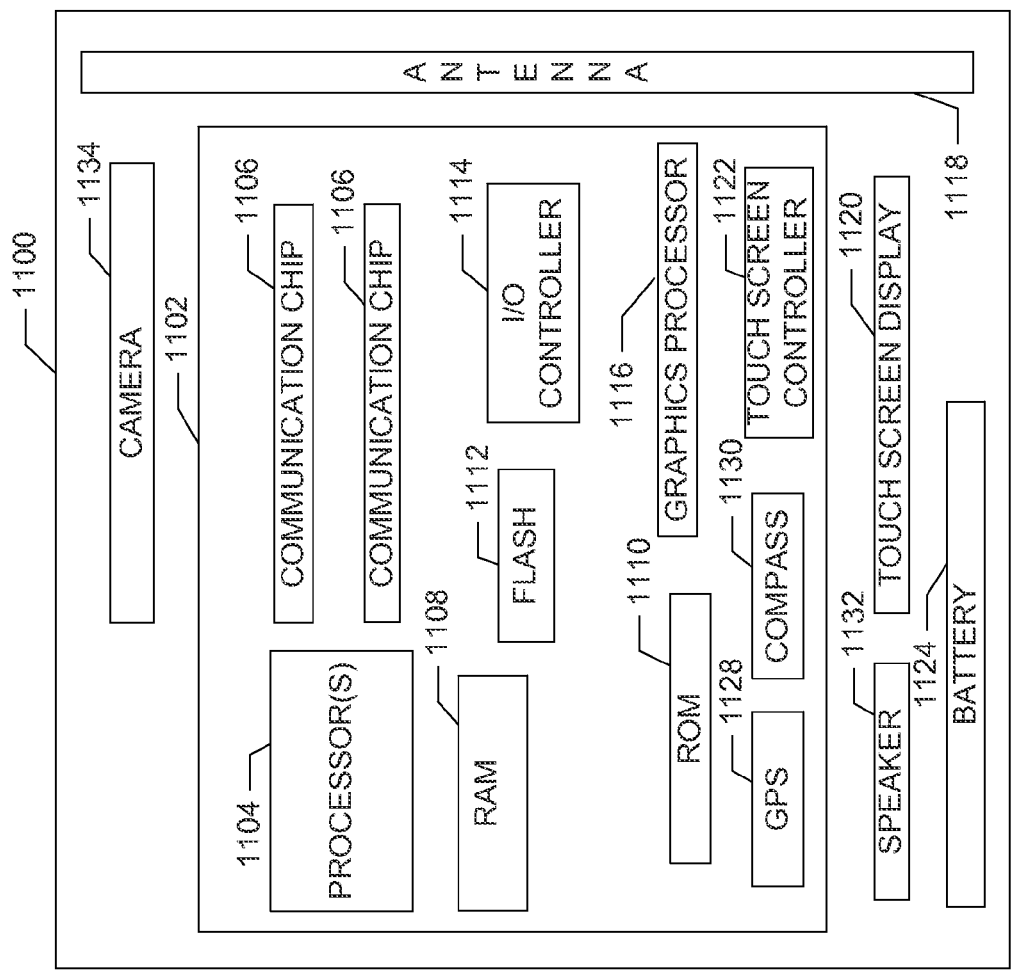
FIG. 11 is a block diagram of an example computing device that may be used to practice various embodiments described herein.

FIG. 11 is a block diagram of an example computing device 1100, which may be suitable for practicing various disclosed embodiments. For example, the computing device 1100 may serve as the remote computing device 102, the computing device 104, and/or or the computing device 106 of FIG. 1. In some embodiments, the components of the computing device 1100 may be distributed across multiple physical device housings or locations, while in other embodiments, the components of the computing device 1100 may be included in a single housing or location.

The computing device 1100 may include a number of components, including one or more processor(s) 1104 and at least one communication chip 1106. In various embodiments, the processor 1104 may include a processor core. In various embodiments, at least one communication chip 1106 may also be physically and electrically coupled to the processor 1104. In further implementations, the communication chip 1106 may be part of the processor 1104. In various embodiments, the computing device 1100 may include a printed circuit board (PCB) 1102. For these embodiments, the processor 1104 and the communication chip 1106 may be disposed thereon. In alternate embodiments, the various components may be coupled without the employment of the PCB 1102.

Depending on its applications (e.g., hardware resource access applications), the computing device 1100 may include other components that may or may not be physically and electrically coupled to the PCB 1102. These other components include, but are not limited to, random access memory (RAM) 1108, volatile memory (such as dynamic RAM (DRAM)), non-volatile memory (e.g., read-only memory 1110, also referred to as "ROM," one or more hard disk drives, one or more solid-state drives, one or more compact disc drives, and/or one or more digital versatile disc drives), flash memory 1112, input/output (I/O) controller 1114, a digital signal processor (not shown), a crypto processor (not shown), graphics processor 1116, one or more antenna 1118, touch screen display 1120, touch screen controller 1122, other displays (such as liquid-crystal displays, cathode-ray tube displays, and e-ink displays, not shown), battery 1124, an audio codec (not shown), a video codec (not shown), global positioning system (GPS) device 1128, compass 1130, an accelerometer (not shown), a gyroscope (not shown), speaker 1132, camera 1134, and a mass storage device (such as hard disk drive, a solid state drive, compact disk (CD), digital versatile disk (DVD)) (not shown), any other desired sensors (not shown) and so forth. In various embodiments, the processor 1104 may be integrated on the same die with other components to form a System on Chip (SoC).

In various embodiments, volatile memory (e.g., DRAM), non-volatile memory (e.g., ROM 1110), flash memory 1112, and the mass storage device may include programming instructions configured to enable the computing device 1100, in response to execution by the processor(s) 1104, to practice all or selected aspects of the processes described herein. For example, one or more of the memory components, such as volatile memory (e.g., DRAM), non-volatile memory (e.g., ROM 1110), flash memory 1112, and the mass storage device may be machine readable media that include temporal and/or persistent (e.g., non-transitory) copies of instructions that, when executed by the one or more processor(s) 1104, enable the computing device 1100 to practice all or selected aspects of the processes described herein. Memory accessible to the computing device 1100 may include one or more storage resources that are physically part of a device on which the computing device 1100 is installed and/or one or more storage resources that are accessible by, but not necessarily a part of, the computing device 1100. For example, a storage resource may be accessed by the computing device 1100 over a network via the communications chip 1106.

The communication chip 1106 may enable wired and/or wireless communications for the transfer of data to and from the computing device 1100. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, communication chips 1106 may implement any of a number of wireless standards or protocols, including but not limited to IEEE02.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 1100 may include a plurality of communication chips 1106. For instance, a first communication chip 1106 may be dedicated to shorter range wireless communications such as Wi-Fi and Bluetooth and a second communication chip 1106 may be dedicated to longer range wireless communications such as GPS, EDGE, GPRS, CDMA, WiMAX, LTE, Ev-DO, and others.

In various implementations, the computing device 1100 may be a laptop, a netbook, a notebook, an ultrabook, a smartphone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 1100 may be any other electronic device that processes data.

The following paragraphs describe examples of various embodiments.

Example 1 is one or more computer readable media having instructions thereon that, in response to execution by one or more processing devices of an apparatus, cause the apparatus to: receive, via a stateless protocol message, a pairing request from an application, wherein the pairing request specifies a hardware resource of a computing device, remote from the apparatus, with which the application requests a pairing; provide, via a stateless protocol message, request data to the computing device, wherein the request data includes an identifier of the application and an identifier of the hardware resource to the computing device; receive, via a stateless protocol message, pairing approval from the computing device, wherein the pairing approval is generated by the computing device based on at least some of the request data; and in response to receipt of the pairing approval, generate a pairing token for provision to the application, wherein the pairing token is to be provided to the computing device by the application, via a stateless protocol message, to pair the application with the hardware resource.

Example 2 may include the subject matter of Example 1, and may further specify that the application executes on the computing device.

Example 3 may include the subject matter of any of Examples 1-2, and may further have instructions thereon that, when executed by the one or more processing devices of the apparatus, cause the apparatus to generate a temporary token for provision to the application, in response to receipt of the pairing request, wherein the temporary token is to be provided to the computing device by the application, via a stateless protocol message, to trigger a request from the computing device to the apparatus, via a stateless protocol message including the temporary token, for the request data.

Example 4 may include the subject matter of Example 3, and may further have instructions thereon that, when executed by the one or more processing devices of the apparatus, cause the apparatus to in response to a stateless protocol message including the temporary token from the application and receipt of the pairing approval, provide the pairing token to the application via a stateless protocol message.

Example 5 may include the subject matter of any of Examples 1-4, and may further specify that the request data includes an Internet Protocol (IP) address of the application.

Example 6 may include the subject matter of Example 5, and may further have instructions thereon that, when executed by the one or more processing devices of the apparatus, cause the apparatus to provide, via a stateless protocol message to the computing device, an IP address of the computing device.

Example 7 is one or more computer readable media having instructions thereon that, in response to execution by one or more processing devices of an apparatus, cause the apparatus to: receive, via a stateless protocol message, request data from a computing device, wherein the request data includes an identifier of a hardware resource of the apparatus and an identifier of an application that has provided a pairing request for pairing with the hardware resource; in response to receipt of the request data, provide, via a stateless protocol message, an approval of the pairing request or a denial of the pairing request to the computing device; receive, via a stateless protocol message, an access request for access to the hardware resource from the application, wherein the access request includes a pairing token that was generated and provided to the application by the computing device in response to receipt by the computing device of an approval of the pairing request; validate or invalidate the pairing token; and provide, via a stateless protocol message, data from the hardware resource for provision to the application in response to validation of the pairing token.

Example 8 may include the subject matter of Example 7, and may further specify that the application executes on the apparatus.

Example 9 may include the subject matter of Example 7, and may further specify that the access request is received from the computing device, and that the application executes on a second computing device different from the computing device.

Example 10 may include the subject matter of Example 9, and may further specify that the access request includes an Internet Protocol (IP) address of the application, and wherein validate or invalidate the pairing token comprises determine that the IP address of the application matches or does not match, respectively, an IP address of the apparatus.

Example 11 may include the subject matter of Example 10, and may further specify that the access request is received from a third computing device different from the computing device and different from a second computing device on which the application executes.

Example 12 may include the subject matter of any of Examples 7-11, and may further specify that validate or invalidate the pairing token comprises determine that the pairing token does or does not identify the apparatus.

Example 13 is an apparatus for regulating pairing with hardware resources, comprising: pairing request receipt logic to receive, via a stateless protocol message, a pairing request from an application, wherein the pairing request specifies a hardware resource of a computing device, remote from the apparatus, with which the application requests a pairing; intermediary logic, coupled with the pairing request receipt logic, to: provide, via a stateless protocol message, request data to the computing device, wherein the request data includes an identifier of the application and an identifier of the hardware resource to the computing device, and receive, via a stateless protocol message, pairing approval from the computing device, wherein the pairing approval is generated by the computing device based on at least some of the request data; and token generation logic, coupled with the intermediary logic, to, in response to receipt of the pairing approval, generate a pairing token for provision to the application, wherein the pairing token is to be provided to the computing device by the application, via a stateless protocol message, to pair the application with the hardware resource.

Example 14 may include the subject matter of Example 13, and may further specify that the application executes on the computing device.

Example 15 may include the subject matter of any of Examples 13-14, and may further specify that the token generation logic is coupled to the pairing request receipt logic, and is further to generate a temporary token for provision to the application, in response to receipt of the pairing request, wherein the temporary token is to be provided to the computing device by the application, via a stateless protocol message, to trigger a request from the computing device to the apparatus, via a stateless protocol message including the temporary token, for the request data.

Example 16 may include the subject matter of Example 15, and may further specify that the token generation logic is further to, in response to a stateless protocol message including the temporary token from the application and receipt of the pairing approval, provide the pairing token to the application via a stateless protocol message.

Example 17 may include the subject matter of any of Examples 13-16, and may further specify that the request data includes an Internet Protocol (IP) address of the application.

Example 18 may include the subject matter of Example 17, and may further specify that the intermediary logic is further to provide, via a stateless protocol message to the computing device, an IP address of the computing device.

Example 19 is an apparatus for regulating access to hardware resources, comprising: pairing request evaluation logic to: receive, via a stateless protocol message, request data from a computing device, wherein the request data includes an identifier of a hardware resource of the apparatus and an identifier of an application that has provided a pairing request for pairing with the hardware resource, and in response to receipt of the request data, provide, via a stateless protocol message, an approval of the pairing request or a denial of the pairing request to the computing device; token evaluation logic to: receive, via a stateless protocol message, an access request for access to the hardware resource from the application, wherein the access request includes a pairing token that was generated and provided to the application by the computing device in response to receipt by the computing device of an approval of the pairing request provided by the pairing request evaluation logic, and validate or invalidate the pairing token; and resource management logic, coupled with the token evaluation logic, to provide, via a stateless protocol message, data from the hardware resource for provision to the application in response to validation of the pairing token.

Example 20 may include the subject matter of Example 19, and may further specify that the application executes on the apparatus.

Example 21 may include the subject matter of Example 19, and may further specify that the access request is received from the computing device, and wherein the application executes on a second computing device different from the computing device.

Example 22 may include the subject matter of Example 21, and may further specify that the access request includes an Internet Protocol (IP) address of the application, and wherein validate or invalidate the pairing token comprises determine that the IP address of the application matches or does not match, respectively, an IP address of the apparatus.

Example 23 may include the subject matter of Example 19, and may further specify that the access request is received from a third computing device different from the computing device and different from a second computing device on which the application executes.

Example 24 may include the subject matter of any of Examples 19-23, and may further specify that the pairing request evaluation logic is included in a kernel application, a network interface card, or a manageability engine.

Example 25 may include the subject matter of any of Examples 19-24, and may further specify that validate or invalidate the pairing token comprises determine that the pairing token does or does not identify the apparatus.

Example 26 is a method for regulating, by an apparatus, pairing with hardware resources, comprising: receiving, via a stateless protocol message, a pairing request from an application, wherein the pairing request specifies a hardware resource of a computing device, remote from the apparatus, with which the application requests a pairing; providing, via a stateless protocol message, request data to the computing device, wherein the request data includes an identifier of the application and an identifier of the hardware resource to the computing device; receiving, via a stateless protocol message, pairing approval from the computing device, wherein the pairing approval is generated by the computing device based on at least some of the request data; and in response to receipt of the pairing approval, generating a pairing token for provision to the application, wherein the pairing token is to be provided to the computing device by the application, via a stateless protocol message, to pair the application with the hardware resource.

Example 27 may include the subject matter of Example 26, and may further specify that the application executes on the computing device.

Example 28 may include the subject matter of any of Examples 26-27, and may further include generating a temporary token for provision to the application, in response to receipt of the pairing request, wherein the temporary token is to be provided to the computing device by the application, via a stateless protocol message, to trigger a request from the computing device to the apparatus, via a stateless protocol message including the temporary token, for the request data.

Example 29 may include the subject matter of Example 28, and may further include, in response to a stateless protocol message including the temporary token from the application and receipt of the pairing approval, providing the pairing token to the application via a stateless protocol message.

Example 30 may include the subject matter of any of Examples 26-29, and may further specify that the request data includes an Internet Protocol (IP) address of the application.

Example 31 may include the subject matter of Example 30, and may further include providing, via a stateless protocol message to the computing device, an IP address of the computing device.

Example 32 is a method for regulating, by an apparatus, access to hardware resources, comprising: receiving, via a stateless protocol message, request data from a computing device, wherein the request data includes an identifier of a hardware resource of the apparatus and an identifier of an application that has provided a pairing request for pairing with the hardware resource; in response to receipt of the request data, providing, via a stateless protocol message, an approval of the pairing request or a denial of the pairing request to the computing device; receiving, via a stateless protocol message, an access request for access to the hardware resource from the application, wherein the access request includes a pairing token that was generated and provided to the application by the computing device in response to receipt by the computing device of an approval of the pairing request; validating or invalidating the pairing token; and providing, via a stateless protocol message, data from the hardware resource for provision to the application in response to validation of the pairing token.

Example 33 may include the subject matter of Example 32, and may further specify that the application executes on the apparatus.

Example 34 may include the subject matter of Example 32, and may further specify that the access request is received from the computing device, and wherein the application executes on a second computing device different from the computing device.

Example 35 may include the subject matter of Example 34, and may further specify that the access request includes an Internet Protocol (IP) address of the application, and wherein validating or invalidating the pairing token comprises determining that the IP address of the application matches or does not match, respectively, an IP address of the apparatus.

Example 36 may include the subject matter of Example 32, and may further specify that the access request is received from a third computing device different from the computing device and different from a second computing device on which the application executes.

Example 37 may include the subject matter of any of Examples 32-36, and may further specify that validating or invalidating the pairing token comprises determining that the pairing token does or does not identify the apparatus.

Example 38 includes one or more computer readable media having instructions thereon that, in response to execution by one or more processing devices of an apparatus, cause the apparatus to perform the method of any of claims 26-37.

Example 39 is an apparatus for regulating pairing with hardware resources, comprising: means for receiving, via a stateless protocol message, a pairing request from an application, wherein the pairing request specifies a hardware resource of a computing device, remote from the apparatus, with which the application requests a pairing; means for providing, via a stateless protocol message, request data to the computing device, wherein the request data includes an identifier of the application and an identifier of the hardware resource to the computing device; means for receiving, via a stateless protocol message, pairing approval from the computing device, wherein the pairing approval is generated by the computing device based on at least some of the request data; and means for generating, in response to receipt of the pairing approval, a pairing token for provision to the application, wherein the pairing token is to be provided to the computing device by the application, via a stateless protocol message, to pair the application with the hardware resource.

Example 40 may include the subject matter of Example 39, and may further specify that the application executes on the computing device.

Example 41 may include the subject matter of any of Examples 39-40, and may further include means for generating a temporary token for provision to the application, in response to receipt of the pairing request, wherein the temporary token is to be provided to the computing device by the application, via a stateless protocol message, to trigger a request from the computing device to the apparatus, via a stateless protocol message including the temporary token, for the request data.

Example 42 may include the subject matter of Example 41, and may further include, means for providing, in response to a stateless protocol message including the temporary token from the application and receipt of the pairing approval, the pairing token to the application via a stateless protocol message.

Example 43 may include the subject matter of any of Examples 39-42, and may further specify that the request data includes an Internet Protocol (IP) address of the application.

Example 44 may include the subject matter of Example 43, and may further include means for providing, via a stateless protocol message to the computing device, an IP address of the computing device.

Example 45 is an apparatus for regulating access to hardware resources, comprising: means for receiving, via a stateless protocol message, request data from a computing device, wherein the request data includes an identifier of a hardware resource of the apparatus and an identifier of an application that has provided a pairing request for pairing with the hardware resource; means for providing, in response to receipt of the request data, via a stateless protocol message, an approval of the pairing request or a denial of the pairing request to the computing device; means for receiving, via a stateless protocol message, an access request for access to the hardware resource from the application, wherein the access request includes a pairing token that was generated and provided to the application by the computing device in response to receipt by the computing device of an approval of the pairing request; means for validating or invalidating the pairing token; and means for providing, via a stateless protocol message, data from the hardware resource for provision to the application in response to validation of the pairing token.

Example 46 may include the subject matter of Example 45, and may further specify that the application executes on the apparatus.

Example 47 may include the subject matter of Example 45, and may further specify that the access request is received from the computing device, and wherein the application executes on a second computing device different from the computing device.

Example 48 may include the subject matter of Example 47, and may further specify that the access request includes an Internet Protocol (IP) address of the application, and wherein the means for validating or invalidating the pairing token comprises means for determining that the IP address of the application matches or does not match, respectively, an IP address of the apparatus.

Example 49 may include the subject matter of Example 45, and may further specify that the access request is received from a third computing device different from the computing device and different from a second computing device on which the application executes.

Example 50 may include the subject matter of any of Examples 45-49, and may further specify that the means for validating or invalidating the pairing token comprises means for determining that the pairing token does or does not identify the apparatus.

Example 51 may include the subject matter of any of Examples 1-50, and may further specify that the stateless protocol messages are REST calls.

What is claimed is:

1. One or more non-transitory computer readable media having instructions thereon that, in response to execution by one or more processing devices of an apparatus, cause the apparatus to:
   receive, via a stateless protocol message, a pairing request from an application, wherein the pairing request specifies a hardware resource of a computing device that is remote from the apparatus to which the application requests a pairing;
   provide, via a stateless protocol message, request data to the computing device, wherein the request data includes an identifier of the application and an identifier of the hardware resource to the computing device;
   receive, via a stateless protocol message, pairing approval from the computing device, wherein the pairing approval is generated by the computing device based on at least some of the request data; and
   in response to receipt of the pairing approval, generate a pairing token for provision to the application, wherein the pairing token is to be provided to the computing device by the application, via a stateless protocol message, to pair the application with the hardware resource.

2. The one or more non-transitory computer readable media of claim 1, wherein the stateless protocol messages are Representational State Transfer (REST) calls.

3. The one or more non-transitory computer readable media of claim 1, further having instructions thereon that, when executed by the one or more processing devices of the apparatus, cause the apparatus to:
   generate a temporary token for provision to the application, in response to receipt of the pairing request, wherein the temporary token is to be provided to the computing device by the application, via a stateless protocol message, to trigger a request from the computing device to the apparatus, via a stateless protocol message including the temporary token, for the request data.

4. The one or more non-transitory computer readable media of claim 3, further having instructions thereon that, when executed by the one or more processing devices of the apparatus, cause the apparatus to:
   in response to a stateless protocol message including the temporary token from the application and receipt of the pairing approval, provide the pairing token to the application via a stateless protocol message.

5. The one or more non-transitory computer readable media of claim 1, wherein the request data includes an Internet Protocol (IP) address of the application.

6. The one or more non-transitory computer readable media of claim 5, further having instructions thereon that, when executed by the one or more processing devices of the apparatus, cause the apparatus to:
   provide, via a stateless protocol message to the computing device, an IP address of the computing device.

7. One or more non-transitory computer readable media having instructions thereon that, in response to execution by one or more processing devices of an apparatus, cause the apparatus to:
   receive, via a stateless protocol message, request data from a computing device, wherein the request data includes an identifier of a hardware resource of the apparatus and an identifier of an application that has provided a pairing request for pairing with the hardware resource;
   in response to receipt of the request data, provide, via a stateless protocol message, an approval of the pairing request or a denial of the pairing request to the computing device;
   receive, via a stateless protocol message, an access request for access to the hardware resource from the application, wherein the access request includes a pairing token that was generated and provided to the application by the computing device in response to receipt by the computing device of an approval of the pairing request;
   validate or invalidate the pairing token; and
   provide, via a stateless protocol message, data from the hardware resource for provision to the application in response to validation of the pairing token.

8. The one or more non-transitory computer readable media of claim 7, wherein the application executes on the apparatus.

9. The one or more non-transitory computer readable media of claim 7, wherein the access request is received from the computing device, and wherein the application executes on a second computing device different from the computing device.

10. The one or more non-transitory computer readable media of claim 9, wherein the access request includes an Internet Protocol (IP) address of the application, and wherein validate or invalidate the pairing token comprises determine that the IP address of the application matches or does not match, respectively, an IP address of the apparatus.

11. The one or more non-transitory computer readable media of claim 7, wherein the access request is received from a third computing device different from the computing device and different from a second computing device on which the application executes.

12. The one or more non-transitory computer readable media of claim 7, wherein validate or invalidate the pairing token comprises determine that the pairing token does or does not identify the apparatus.

13. An apparatus for regulating pairing with hardware resources, comprising:
   one or more processors coupled with one or more memory devices;
   the one or more processors to implement pairing request receipt logic to receive, via a stateless protocol message, a pairing request from an application, wherein the pairing request specifies a hardware resource of a computing device remote from the apparatus to which the application requests a pairing;
   the one or more processors to implement intermediary logic, coupled with the pairing request receipt logic, to:
      provide, via a stateless protocol message, request data to the computing device, wherein the request data includes an identifier of the application and an identifier of the hardware resource to the computing device, and
      receive, via a stateless protocol message, pairing approval from the computing device, wherein the pairing approval is generated by the computing device based on at least some of the request data; and
   the one or more processors to implement token generation logic coupled with the intermediary logic, the token logic to, in response to receipt of the pairing approval, generate a pairing token for provision to the application, wherein the pairing token is to be provided to the computing device by the application, via a stateless protocol message, to pair the application with the hardware resource.

14. The apparatus of claim 13, wherein the application executes on the computing device.

15. The apparatus of claim 13, wherein the token generation logic is coupled to the pairing request receipt logic, and is further to generate a temporary token for provision to the application, in response to receipt of the pairing request, wherein the temporary token is to be provided to the computing device by the application, via a stateless protocol message, to trigger a request from the computing device to the apparatus, via a stateless protocol message including the temporary token, for the request data.

16. The apparatus of claim 15, wherein the token generation logic is further to, in response to a stateless protocol message including the temporary token from the application and receipt of the pairing approval, provide the pairing token to the application via a stateless protocol message.

17. The apparatus of claim 13, wherein the request data includes an Internet Protocol (IP) address of the application.

18. The apparatus of claim 17, wherein the intermediary logic is further to provide, via a stateless protocol message to the computing device, an IP address of the computing device.

19. An apparatus for regulating access to hardware resources, comprising:
   one or more processors coupled with one or more memory devices;
   the one or more processors to implement pairing request evaluation logic to:
      receive, via a stateless protocol message, request data from a computing device, wherein the request data includes an identifier of a hardware resource of the apparatus and an identifier of an application that has provided a pairing request for pairing with the hardware resource, and
      in response to receipt of the request data, provide, via a stateless protocol message, an approval of the pairing request or a denial of the pairing request to the computing device;
   the one or more processors to implement token evaluation logic to:
      receive, via a stateless protocol message, an access request for access to the hardware resource from the application, wherein the access request includes a pairing token that was generated and provided to the application by the computing device in response to receipt by the computing device of an approval of the pairing request provided by the pairing request evaluation logic, and
      validate or invalidate the pairing token; and
   the one or more processors to implement resource management logic, coupled with the token evaluation logic, to provide, via a stateless protocol message, data from the hardware resource for provision to the application in response to validation of the pairing token.

20. The apparatus of claim 19, wherein the application executes on the apparatus.

21. The apparatus of claim 19, wherein the access request is received from the computing device, and wherein the application executes on a second computing device different from the computing device.

22. The apparatus of claim 21, wherein the access request includes an Internet Protocol (IP) address of the application, and wherein validate or invalidate the pairing token comprises determine that the IP address of the application matches or does not match, respectively, an IP address of the apparatus.

23. The apparatus of claim 19, wherein the access request is received from a third computing device different from the computing device and different from a second computing device on which the application executes.

24. The apparatus of claim 19, wherein the pairing request evaluation logic is included in a kernel application, a network interface card, or a manageability engine.

25. The apparatus of claim 19, wherein the stateless protocol messages are Representational State Transfer (REST) calls.

* * * * *